(12) United States Patent
Harada et al.

(10) Patent No.: US 7,820,254 B2
(45) Date of Patent: Oct. 26, 2010

(54) NEAR INFRARED-ABSORBING DYE-CONTAINING CURABLE COMPOSITION

(75) Inventors: Toru Harada, Minami-ashigara (JP); Toru Yamada, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 509 days.

(21) Appl. No.: 11/730,377

(22) Filed: Mar. 30, 2007

(65) Prior Publication Data

US 2007/0238802 A1 Oct. 11, 2007

(30) Foreign Application Priority Data

Mar. 30, 2006 (JP) ............... 2006-094872

(51) Int. Cl.
*C09B 23/00* (2006.01)
*C09B 67/46* (2006.01)
*C09K 19/00* (2006.01)
*G08F 1/00* (2006.01)

(52) U.S. Cl. ............... 428/1.31; 430/7; 430/20; 522/16; 522/26; 522/75; 522/121; 524/88

(58) Field of Classification Search ............... 522/16, 522/26, 75, 121; 548/427, 400, 416; 430/7, 430/20; 428/1.31; 524/88
See application file for complete search history.

(56) References Cited

U.S. PATENT DOCUMENTS

| | | | | |
|---|---|---|---|---|
| 5,248,576 A | * | 9/1993 | Yokoyama et al. | 430/7 |
| 5,268,486 A | * | 12/1993 | Waggoner et al. | 548/427 |
| 5,578,425 A | * | 11/1996 | Dickerson et al. | 430/347 |
| 5,631,111 A | * | 5/1997 | Niu et al. | 430/7 |
| 5,945,209 A | * | 8/1999 | Okazaki et al. | 428/304.4 |
| 6,069,244 A | * | 5/2000 | Masuda et al. | 540/139 |
| 6,117,370 A | * | 9/2000 | Hasegawa et al. | 252/587 |
| 6,136,612 A | * | 10/2000 | Della et al. | 436/546 |
| 6,210,871 B1 | * | 4/2001 | Ishii et al. | 430/584 |
| 6,597,525 B2 | * | 7/2003 | Kubota | 359/885 |
| 6,977,305 B2 | * | 12/2005 | Leung et al. | 548/450 |
| 7,018,751 B2 | * | 3/2006 | Andrews et al. | 430/7 |
| 7,063,936 B2 | * | 6/2006 | Kakino et al. | 430/287.1 |
| 7,083,906 B2 | * | 8/2006 | Suzuki et al. | 430/510 |
| 7,157,193 B2 | * | 1/2007 | Kawamura et al. | 430/7 |
| 7,238,807 B2 | * | 7/2007 | Duran et al. | 544/257 |
| 7,488,468 B1 | * | 2/2009 | Miwa et al. | 424/9.6 |
| 7,510,456 B2 | * | 3/2009 | D'Haene et al. | 445/24 |
| 2005/0042537 A1 | * | 2/2005 | Hachiya et al. | 430/265 |

FOREIGN PATENT DOCUMENTS

| | | |
|---|---|---|
| JP | 7-219139 A | 8/1995 |
| JP | 8-333519 A | 12/1996 |
| JP | 2002-90521 A | 3/2002 |

* cited by examiner

*Primary Examiner*—Susan W Berman
(74) *Attorney, Agent, or Firm*—Birch, Stewart, Kolasch & Birch, LLP

(57) ABSTRACT

A curable composition containing a lake dye having an absorption maximum in the wavelength region of from 700 nm to 1100 nm and a thermosetting compound and/or a photo-setting compound; a solid imaging device installing therein a filter prepared using the curable composition; and a lake dye represented by the following formula (V):

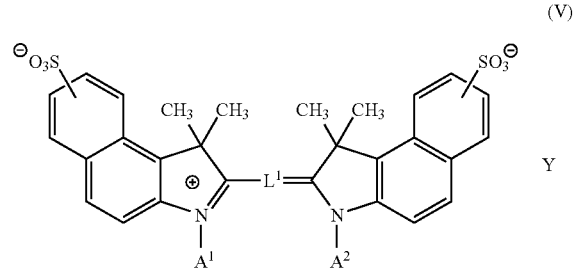

(V)

wherein $L^1$ represents a methine chain composed of odd number(s) of methine group(s); $A^1$ and $A^2$ are each independently represents an alkyl group having a sulfo group; Y represents a cation necessary to balance a charge and selected from the group consisting of alkali earth metal ions ($Mg^{2+}$, $Ca^{2+}$, $Ba^{2+}$, $Sr^{2+}$), transition metal ions ($Ag^+$, $Fe^+$, $Co^{2+}$, $Ni^{2+}$, $Cu^{2+}$, $Zn^{2+}$) and ($Al^{3+}$).

5 Claims, No Drawings

NEAR INFRARED-ABSORBING DYE-CONTAINING CURABLE COMPOSITION

FIELD OF THE INVENTION

The present invention relates to a near infrared-absorbing dye-containing curable composition that can be used for a solid state imaging device (e.g., CCD, CMOS) and the like.

BACKGROUND OF THE INVENTION

The silicon photodiode used in a solid state imaging device has sensitivity not only in the visible region, but also up to the near infrared. Therefore, as for a seal glass, it is ordinary to use a glass to which a near infrared cut function is given in order to cut a near infrared.

However, because such the glass having a near infrared cut function is expensive, it has been desired to develop a liquid composition having such the near infrared cut function, and moreover to develop a thermosetting or photo-setting composition.

When a liquid composition is marketed, the liquid composition is handled like a color filter. Therefore, both heat resistance and light fastness different from a glass are required. However, conventional near infrared cut materials are not sufficient for heat resistance and light fastness. Resultantly, there is no liquid composition of the practical use level on the market because of its inferior heat resistance and light fastness.

There are many patent publications relating to the near infrared cut materials including not only inorganic materials, but also organic materials. As the inorganic compound, there are known a Cu-containing resin film having formed a complex of a phosphorus-containing resin and $Cu^+$, described in publications such as JP-A-2001-154015 ("JP-A" means unexamined published Japanese patent application), JP-A-9-184914 and JP-A-8-75919; ytterbium phosphate compounds described in publications such as JP-A-10-49642 and JP-A-10-88107; cupper phosphate described in publications such as JP-A-2004-231708; metal oxides represented by ITO, ATO, Zinc oxide and the like; hexa boride particles described in publications such as JP-A-2004-18295; metal nano rods described in publications such as JP-A-2004-198665 and JP-A-2003-315531; and the like.

As the organic compound, there are known phthalocyanine compounds described in publications such as JP-A-2000-214628, JP-A-2000-26748 and JP-A-11-60579; dimonium compounds described in publications such as JP-A-11-323121; naphthalocyanine compounds described in publications such as JP-A-2000-44883, JP-A-11-60580 and JP-A-11-152415; aminonaphthalocyanine compounds described in publications such as JP-A-11-152416; aminothiophenolate-series metal complex dyes described in publications such as JP-A-11-349920; cyanine dyes and oxonol dyes described in publications such as JP-A-2002-90521; squarylium dyes and croconium dyes described in publications such as JP-A-2002-122729; quinodimethane derivatives described in publications such as JP-A-11-116567; polymethine-series dye compounds described in publications such as JP-A-2000-302992; anthraquinone compounds described in publications such as JP-A-2001-108815; substituted sulfonylbenzenedithiol nickel complexes described in publications such as JP-A-2001-288380; and the like. Almost all of these compounds are known as applications to plasma display. As for applications to the above-described solid state imaging device, however, there is no description of a liquid composition that can be used as a substitute of the seal glass from the viewpoints of heat resistance and light fastness.

In fact, those compounds as described in these patent publications are insufficient for use of the solid state imaging device in terms of heat resistance and light fastness. Further, many of these compounds are difficult to distinguish a visible region from a near infrared region.

In view of these problems, it has been desired to develop a near infrared-absorbing dye-containing liquid composition that has substantially no absorption in the visible region, but in the near infrared region, thereby having ability to cut a needless near infrared light to which a silicon photodiode has sensitivity, and also that is excellent in heat resistance and light fastness. Besides, a further improvement of light fastness has been desired with respect to the near infrared-absorbing filter for a plasma display panel.

SUMMARY OF THE INVENTION

The present invention resides in a curable composition comprising a lake dye having an absorption maximum in the wavelength region of from 700 nm to 1100 nm and a thermo-setting compound and/or a photo-setting compound; a solid state imaging device comprising a filter prepared using the curable composition; and a lake dye represented by the following formula (V):

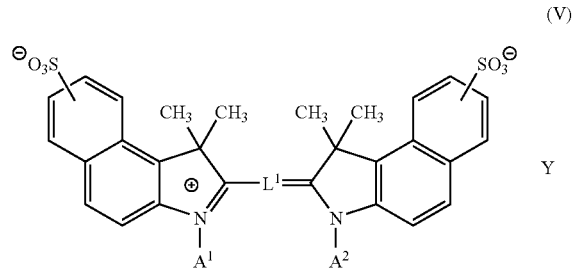

wherein $L^1$ represents a methine chain composed of odd number(s) of methine group(s); $A^1$ and $A^2$ each independently represents an alkyl group having a sulfo group; Y represents a cation necessary to balance a charge and is selected from the group consisting of alkali earth metal ions ($Mg^{2+}$, $Ca^{2+}$, $Ba^{2+}$, $Sr^{2+}$), transition metal ions ($Ag^+$, $Fe^+$, $Co^{2+}$, $Ni^{2+}$, $Cu^{2+}$, $Zn^{2+}$) and ($Al^{3+}$).

Other and further features and advantages of the invention will appear more fully from the following description.

DETAILED DESCRIPTION OF THE INVENTION

According to the present invention, there is provided the following means:

(1) A curable composition comprising a lake dye having an absorption maximum in the wavelength region of from 700 nm to 1100 nm and a thermo-setting compound and/or a photo-setting compound.

(2) The curable composition as described in the item (1), wherein the above-described dye is a methine dye.

(3) The curable composition as described in the item (2), wherein the above-described methine dye is a cyanine dye represented by the following formula (I) or an oxonol dye represented by the following formula (II):

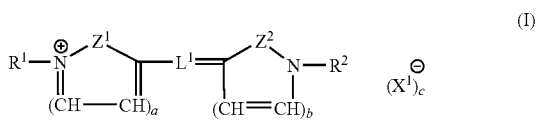 (I)

wherein $Z^1$ and $Z^2$ each independently represents non-metallic groups necessary to form a 5- or 6-membered nitrogen-containing hetero ring that may be condensed; $R^1$ and $R^2$ each independently represents an aliphatic group or an aromatic group; $L^1$ represents a methine chain composed of odd number(s) of methine group(s); a, b and c each independently represents 0 or 1; and $X^1$ represents an anion;

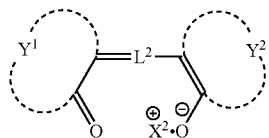 (II)

wherein $Y^1$ and $Y^2$ each independently represents an aliphatic group or non-metallic groups necessary to form a hetero ring; $L^2$ represents a methine chain composed of odd number(s) of methine group (s); and $X^2$ represents a hydrogen atom or a cation.

(4) The curable composition as described in the item (2), wherein the above-described methine dye is a squarylium dye or croconium dye represented by the following formula (III) or (IV):

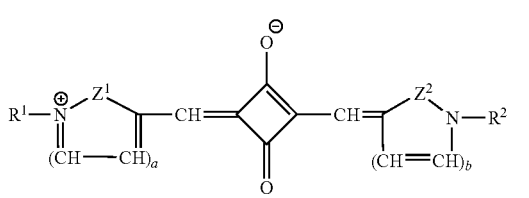 (III)

wherein $Z^1$ and $Z^2$ each independently represents non-metallic groups necessary to form a 5- or 6-membered nitrogen-containing hetero ring that may be condensed; $R^1$ and $R^2$ each independently represents an aliphatic group or an aromatic group; a and b each independently represents 0 or 1;

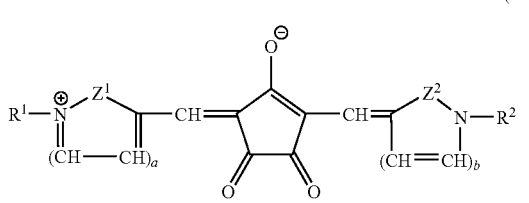 (IV)

wherein $Z^1$ and $Z^2$ each independently represents non-metallic groups necessary to form a 5- or 6-membered nitrogen-containing hetero ring that may be condensed; $R^1$ and $R^2$ each independently represents an aliphatic group or an aromatic group; a and b each independently represents 0 or 1.

(5) The curable composition as described in the item (3), wherein the above-described dye represented by formula (I) is a lake dye represented by the following formula (V):

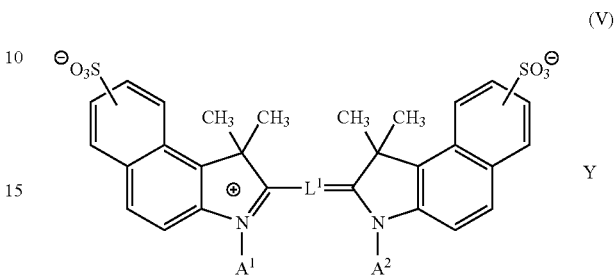 (V)

wherein $L^1$ represents a methine chain composed of odd number(s) of methine group(s); $A^1$ and $A^2$ each independently represents an alkyl group having a sulfo group; Y represents a cation necessary to balance a charge and is selected from the group consisting of alkali earth metal ions ($Mg^{2+}$, $Ca^{2+}$, $Ba^{2+}$, $Sr^{2+}$), transition metal ions ($Ag^+$, $Fe^+$, $Co^{2+}$, $Ni^{2+}$, $Cu^{2+}$, $Zn^{2+}$) and ($Al^{3+}$).

(6) The curable composition as described in any one of the items (1) to (5), wherein the dye is a dye in an association state.

(7) The curable composition as described in any one of the items (1) to (6), comprising a binder, a free-radical polymerizable monomer, a photo polymerization initiator, a heat polymerization initiator, a crosslinking agent, and/or a dispersant.

(8) The curable composition as described in any one of the items (1) to (7) that is used for a solid state imaging device.

(9) The curable composition as described in any one of the items (1) to (7) that is used for a plasma display panel.

(10) A near infrared-absorbing filter comprising the curable composition as described in any one of the items (1) to (7).

(11) A solid state imaging device comprising a filter prepared using the curable composition as described in any one of the items (1) to (7).

(12) A lake dye represented by the following formula (V):

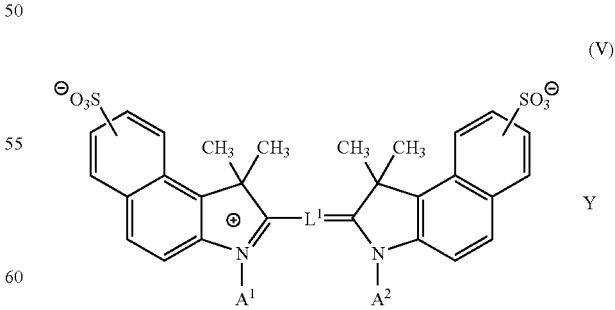 (V)

wherein $L^1$ represents a methine chain composed of odd number(s) of methine group(s); $A^1$ and $A^2$ each independently represent an alkyl group having a sulfo group; Y represents a cation necessary to balance a charge and is selected from the group consisting of alkali earth metal ions ($Mg^{2+}$, $Ca^{2+}$, $Ba^{2+}$, $Sr^{2+}$), transition metal ions ($Ag^+$, $Fe^+$, $Co^{2+}$, $Ni^{2+}$, $Cu^{2+}$, $Zn^{2+}$) and ($Al^{3+}$).

The use of the near infrared-absorbing dye-containing curable composition of the present invention enables to prepare a near infrared cut filter that is excellent in heat resistance and light fastness. Resultantly, inexpensive solid state imaging devices can be obtained with neither necessity of employing an expensive glass, nor change of a conventional process, and also without deteriorating a quality. Further, it is recognized that the near infrared-absorbing dye-containing curable composition of the present invention is useful to a near infrared-absorbing filter for a plasma display panel. Further, the near infrared-absorbing dye-containing curable composition of the present invention can be use as an optical filter such as a solid state imaging device (e.g., CCD, CMOS) and the like, as well as a plasma display panel and an ink for inkjet printing.

The following is a detailed description of the near infrared-absorbing dye-containing curable composition of the present invention and a film formed using the same.

[Near Infrared-Absorbing Dye-Containing Curable Composition]

The near infrared-absorbing dye-containing curable composition of the present invention contains not only said near infrared-absorbing dye, but also a thermo-setting compound and/or a photo-setting compound, and preferably further contains a binder including an alkali-soluble resin, and a free-radical polymerizable monomer. In addition, the curable composition may contain a photo polymerization initiator, a heat polymerization initiator, a crosslinking agent including a thermo-setting resin, and a dispersant, and moreover it may contain other additives such as an organic solvent, a surface modifier and a surfactant. As for the solvent used in the curable composition, any one of water and organic solvents may be chosen in accordance with a use. The amount of the lake dye in the composition of the present invention is preferably 0.1 mass % to 30 mass %, more preferably 0.2 mass % to 20 mass %, and most preferably 0.5 mass % to 10 mass %, based on the total amount of the composition. Further, the amount of the thermo-setting compound and/or the photo-setting compound in the composition of the present invention is preferably 0.1 mass % to 90 mass %, more preferably 0.5 mass % to 80 mass %, and most preferably 1 mass % to 70 mass %, based on the total amount of the composition.

<Near Infrared Cut Absorbing Dye>

The curable composition of the present invention exhibits maximum light absorption in the ranges of 700 to 1100 nm. The transmittance of the curable composition in the aforementioned wavelength ranges of the maximum absorption is generally between 0.01 and 30%, preferably between 0.05 and 20%, and most preferably between 0.1 and 10%.

In the present invention, it is preferable to use a lake dye and more preferably association (aggregation) of the lake dye in order to give the above-described absorption spectrum to the curable composition. In the present invention, the lake dye means a lake dyestuff or a lake pigment.

The absorption spectra of the dye exhibiting the maximum absorption in the above wavelength range of 700 to 1100 m preferably has a sub-absorption in the range of visible light (400 to 700 nm) as small as possible. In order to obtain a preferable absorption waveform, there can be provided as a solution of a dye solved in water or other solvent. However, it is preferable to use a dye in an association state, especially preferred is an associate including a J-aggregation, in order to improve the heat resistance and light fastness.

The dye in the association state forms a so-called J-band and exhibits a sharp peak in its absorption spectrum. Descriptions of the aggregated dye and J-band can be found in various references (e.g. Photographic Science and Engineering, Vol. 18, pages 323-335 (1974)). The absorption maximum of dye in a J-aggregation state shifts to the longer wavelength side than that of dye in a solution state. Accordingly, a judgement whether the dye contained in a filter layer is in an aggregation state or not can easily be made by absorption maximum measurement.

Preferable examples of the methine dye, as the near infrared-absorbing dye of the present invention, include cyanine, squarylium, croconium, merocyanine, oxonol, and styryl. Among these, cyanine, oxonol, squarylium and croconium are preferable, cyanine and oxonol are more preferable. These dyes may be used solely or in combination.

The cyanine dye is defined by the following formula:

$$Bs=Lo-Bo$$

wherein Bs represents a basic nucleus, Bo represents an onium form of the basic nucleus, and Lo represents a methine chain constituted of an odd number of methines.

Further, the cyanine dye represented by the following formula (I) can be preferably used, especially in the state of association.

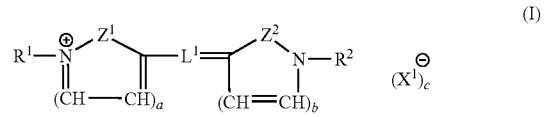

In formula (I), $Z^1$ and $Z^2$ each independently represent a group of non-metal atom(s) necessary to complete a 5- or 6-membered nitrogen-containing heterocycle. Another heterocycle, aromatic ring or aliphatic ring may be condensed, to the nitrogen-containing heterocycle. Examples of the nitrogen-containing heterocycle and the condensed ring include an oxazole ring, an isoxazole ring, a benzoxazole ring, a naphthoxazole ring, an oxazolocarbazole ring, an oxazolodibenzofuran ring, a thiazole ring, a benzothiazole ring, a naphthothiazole ring, an indolenine ring, a benzoindolenine ring, an imidazole ring, a benzoimidazole ring, a naphthoimidazole ring, a quinoline ring, a pyridine ring, a pyrrolopyridine ring, a furopyrrole ring, an indolizine ring, an imidazoquinoxaline ring, a quinoxaline ring, and the like. As the nitrogen-containing heterocycle, a 5-membered ring is more preferable than a 6-membered ring. A 5-membered nitrogen-containing heterocycle to which a benzene ring or a naphthalene ring is condensed is further more preferable. Specifically, a benzothiazole ring, a naphthothiazole ring, a quinoline ring, an indolenine ring or a benzoindolenine ring are preferable.

The nitrogen-containing heterocycle and the ring condensed thereto may have a substituent. Examples of the substituent include a halogen atom, a cyano group, a nitro group, an aliphatic group, an aromatic group, a heterocyclic group, $—OR^{10}$, $—COR^{11}$, $—COOR^{12}$, $—OCOR^{13}$, $—N^{14}R^{15}$, $—NCOR^{16}$, $CONR^{17}R^{18}$, $—NHCONR^{19}R^{20}$, $—NHCOOR^{21}$, $—SR^{22}$, $—SO_2R^{23}$, $—SO_2OR^{24}$, $—NHSO_2R^{25}$ or $—SO_2NR^{26}R^{27}$. $R^{10}$ to $R^{27}$ each independently represent a hydrogen atom, an aliphatic group, an aromatic group or a heterocyclic group. In a case in which $R^{12}$ of $—COOR^{12}$ is a hydrogen atom (i.e., a carboxyl group) and in a case in which $R^{24}$ of —$SO_2OR^{24}$ is a hydrogen atom (i.e., a sulfo group), the hydrogen atom in each case may be dissociated or the group may be in the state of a salt.

In the present invention, the aliphatic group represents an alkyl group, an alkenyl group, an alkynyl group or an aralkyl group. These groups each may have a substituent.

The alkyl group may be either a cycloalkyl group or a chain-alkyl group. The chain-like alkyl group may be branched. The number of carbon atoms of the alkyl group is preferably 1 to 20, more preferably 1 to 12, and most preferably 1 to 8. Examples of the alkyl group include methyl, ethyl, propyl, isopropyl, butyl, t-butyl, cyclopropyl, cyclohexyl and 2-ethylhexyl.

The alkyl moiety of the substituted alkyl group has the same meaning as that of the aforementioned alkyl group. The substituent in the substituted alkyl group has the same meaning as the substituent on the nitrogen-containing heterocycle of $Z^1$ and $Z^2$ (however, the cyano group and the nitro group are excluded). Examples of the substituted alkyl group include 2-hydroxyethyl, 2-carboxyethyl, 2-methoxyethyl, 2-diethylaminoethyl, 2-sulfoethyl, 3-sulfopropyl, 3-sulfobutyl and 4-sulfobutyl.

The alkenyl group may be either cyclic or chain. The chain-like alkenyl group may be branched. The number of carbon atoms of the alkenyl group is preferably 2 to 20, more preferably 2 to 12, and most preferably 2 to 8. Examples of the alkenyl group include vinyl, allyl, 1-propenyl, 2-butenyl, 2-pentenyl, and 2-hexenyl.

The alkenyl moiety of the substituted alkenyl group has same meaning as that of the aforementioned alkenyl group. The substituent in the substituted alkenyl group has the same meaning as the substituent of the alkyl group.

The alkynyl group may be either cyclic or chain. The chain-like alkynyl group may be branched. The number of carbon atoms of the alkynyl group is preferably 2 to 20, more preferably 2 to 12, and most preferably 2 to 8. Examples of the alkynyl group include ethinyl and 2-propynyl.

The alkynyl moiety of the substituted alkynyl group has the same meaning as that of the aforementioned alkynyl group. The substituent in the substituted alkynyl group has the same meaning as the substituent of the alkyl group.

The alkyl moiety of the aralkyl group has the same meaning as that of the aforementioned alkyl group. The aryl moiety of the aralkyl group is has the same meaning as the aryl group described below. Examples of the aralkyl group include benzyl and phenethyl.

The aralkyl moiety of the substituted aralkyl group has the same meaning as that of the aforementioned aralkyl group. The aryl moiety of the substituted aralkyl group has the same meaning as that of the aryl group described below.

In the present invention, the aromatic group means an unsubstituted aryl group or a substituted aryl group.

The number of carbon atoms of the aryl group is preferably 6 to 25, more preferably 6 to 15, and most preferably 6 to 10. Examples of the aryl group include phenyl and naphthyl.

Examples of the substituent of the substituted aryl group have the same meanings as those of the substituent of the nitrogen-containing heterocycle of $Z^1$ and $Z^2$. Examples of the substituted aryl group include 4-carboxyphenyl, 4-acetoamidophenyl, 3-methanesulfoneamidophenyl, 4-methoxyphenyl, 3-carboxyphenyl, 3,5-dicarboxyphenyl, 4-methanesulfoneamidophenyl and 4-butanesulfoneamidophenyl.

In the present invention, the heterocyclic group may have a substituent. It is preferable that the heterocycle of the heterocyclic group is a 5- or 6-membered ring. The heterocycle may have an aliphatic ring or an aromatic ring or another heterocyclic ring condensed thereto. Examples of the heterocycle (including the condensed ring) include a pyridine ring, a pyperidine ring, a furan ring, a furan ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring and a thiadiazole ring.

The substituent on the heterocycle has the same meaning as the substituent of the nitrogen-containing heterocycle of $Z^1$ and $Z^2$.

The aliphatic group and the aryl group represented by $R^1$ and $R^2$ of the formula (I) have the same meanings as those described above.

$L^1$ is a methine chain constituted of an odd number (preferably 5 or 7) of methines. The methine group may have a substituent. The methine group having the substituent is preferably the methine group present at the center (i.e., the methine group at the meso position). Examples of the substituent have the same meanings as those of the substituent of the nitrogen-containing heterocycle of $Z^1$ and $Z^2$. Two substituents on a methine chain may bond together, to form a 5- or 6-membered ring.

a, b and c each independently represent 0 or 1, a and b are preferably zero (0). In a case in which the cyanine dye has an anionic substituent, such as sulfo or carboxyl, to form an intermolecular salt, c is zero.

$X^1$ is an anion. Examples of the anion include a halide ion ($Cl^-$, $Br^-$, $I^-$), a p-toluenesulfonic acid ion, an ethylsulfuric acid ion, $PF_6^-$, $BF_4^-$ or $ClO_4^-$.

The cyanine dye used in the present invention preferably contains a carboxyl group (or a salt thereof) or a sulfo group (or a salt thereof), with the sulfo group being especially preferred. Preferable examples of a cation forming the counter salt include alkali metal ions (e.g., $Li^+$, $Na^+$, $K^+$), alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cu^{2+}$, $Zn^{2+}$), other metal ions (e.g., $Al^{3+}$), ammonium ion, triethyl ammonium ion, tributyl ammonium ion, pyridinium ion, and tetrabutyl ammonium ion. More preferred are alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cu^{2+}$, $Zn^{2+}$) and other metal ions (e.g., $Al^{3+}$). Especially preferred are $Mg^{2+}$, $Ca^{2+}$ and $Zn^{2+}$.

More preferred is a lake dye represented by formula (VI), with associated lake dyes being furthermore preferred.

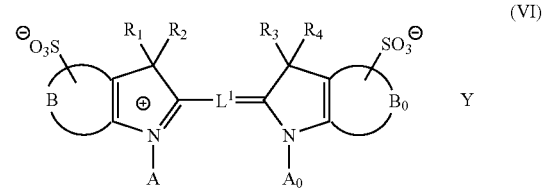

(VI)

$L^1$ represents a methine chain composed of odd number(s) of methine group (s); $R_1$ to $R_4$, A and $A_0$ each independently represents an alkyl group; B and Bo each independently represents atom groups necessary to form an aromatic hydrocarbon ring, or an aromatic hetero ring; Y represents a cation necessary to balance a charge and is selected from the above-described preferable cations: alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cu^{2+}$, $Zn^{2+}$) and other metal ions (e.g., $Al^{3+}$).

More minutely, $L^1$ is preferably seven methine chain. A plurality of $L^1$ may be the same or different and may bond together to form a 5- to 7-membered ring (preferably 5- or 6-membered ring). The alkyl group represented by $R_1$ to $R_4$, A and $A_0$ has the same meanings as the alkyl group of the above-described aliphatic group. $R_1$ to $R_4$ are each preferably a lower alkyl group having 1 to 3 carbon atoms, or a $C_5$- or $C_6$-alicyclic group that is formed by connecting $R_1$ and $R_2$, or $R_3$ and $R_4$. A and $A_0$ are each preferably an alkyl group having a sulfo group (e.g., sulfoethyl, sulfopropyl, sulfobutyl). The cation represented by Y is especially preferably Ca, Mg, Sr and Zn.

More preferred is a lake dye represented by formula (V), with associated lake dyes being furthermore preferred.

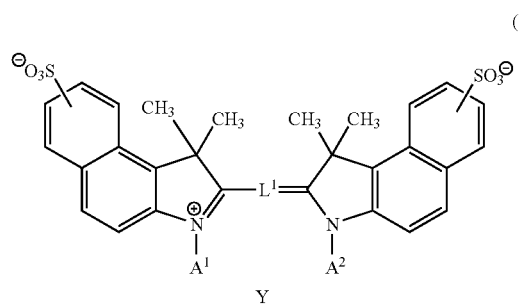

(V)

$L^1$ represents a methine chain composed of odd number(s) of methine group (s); $A^1$ and $A^2$ each independently represents an alkyl group having a sulfo group; Y represents a cation necessary to balance a charge and is selected from the above-described preferable cations: alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cu^{2+}$, $Zn^{2+}$) and other metal ions (e.g., $Al^{3+}$).

More minutely, $L^1$ is preferably seven methine chain. A plurality of $L^1$ may be the same or different and may bond together to form a 5- to 7-membered ring (preferably 5- or 6-membered ring). Of the substituent of a methine chain, preferred are alkyl groups (e.g., 1 to 4 carbon atoms), halogen atoms (e.g., Cl, Br), aryl groups (the same meanings as the above), heterocyclic groups (the same meanings as the above), or $SR^{20}$ ($R^{20}$ represents an alkyl group or an aryl group each having the same meanings as the above). $A^1$ and $A^2$ are each independently represents an alkyl group having a sulfo group. Preferred are sulfoethyl, sulfopropyl, and sulfobutyl. The cation represented by Y is preferably Ca, Mg, Sr and Zn, especially preferable Mg and Zn.

Specific examples of the cyanine dye are shown below.

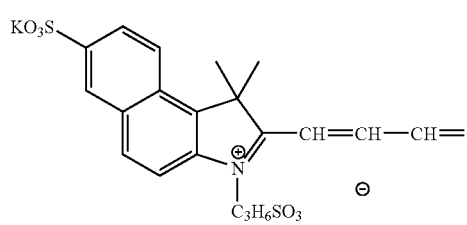

(1-1)

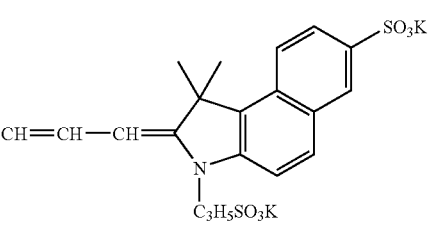

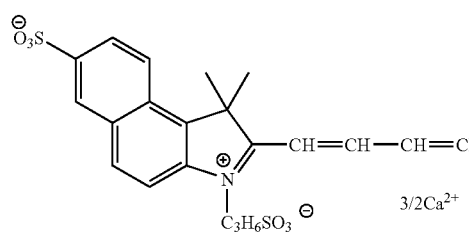

(1-2)

(1-3)

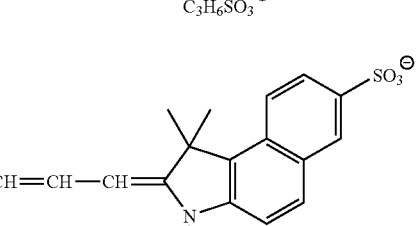

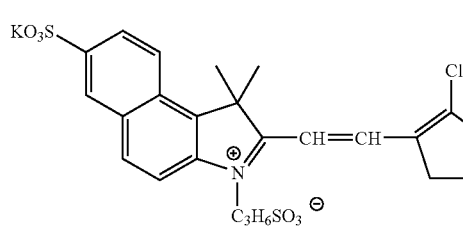

(1-4)

-continued
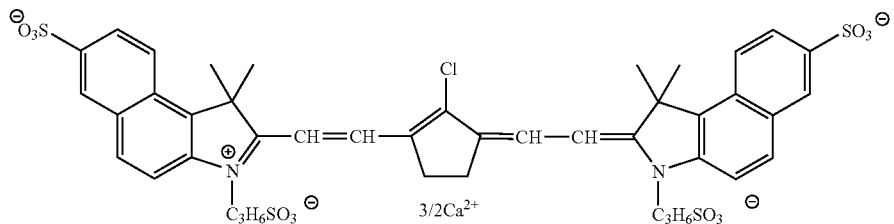
(1-5)
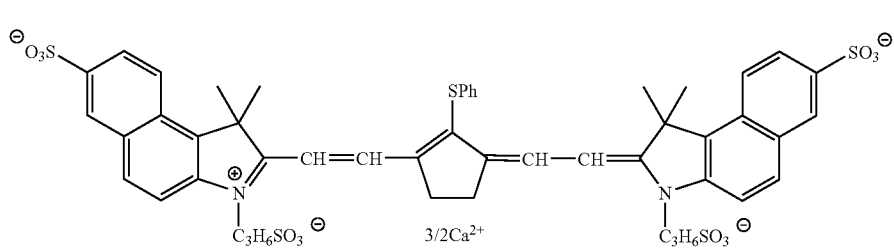
(1-6)
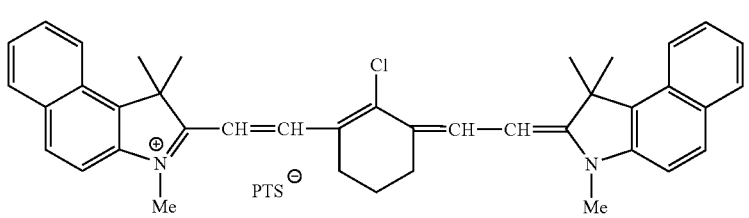
(1-7)
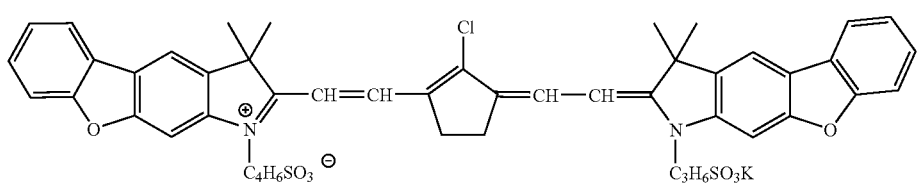
(1-8)
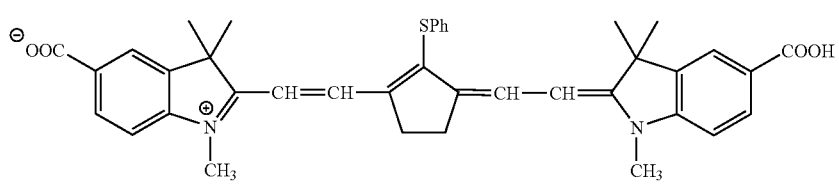
(1-9)
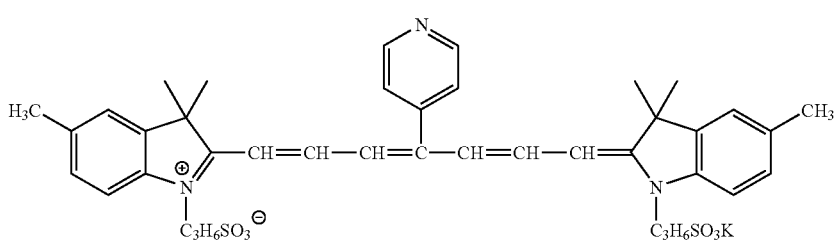
(1-10)
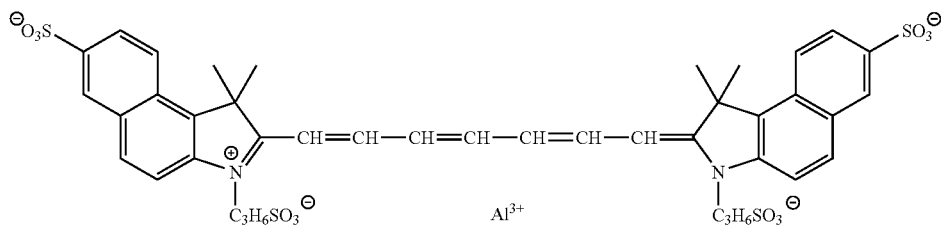
(1-11)

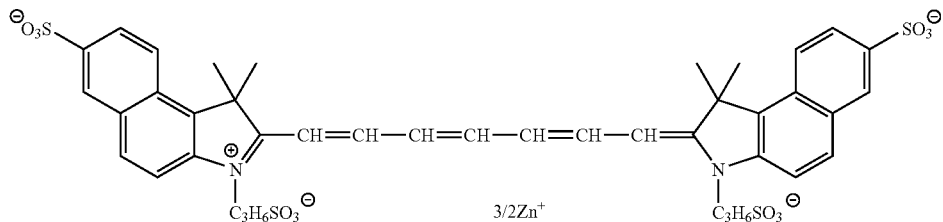
(1-12)
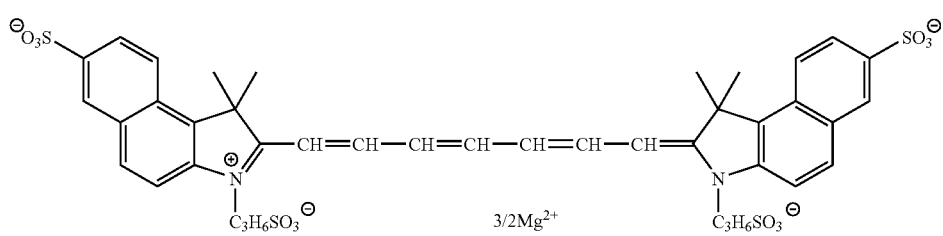
(1-13)
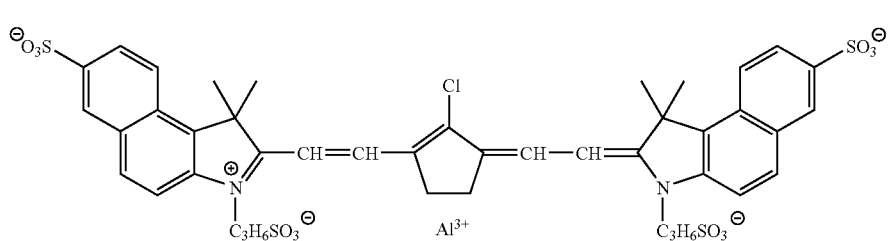
(1-14)
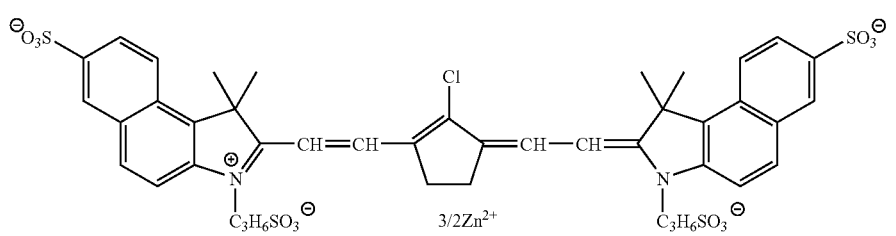
(1-15)
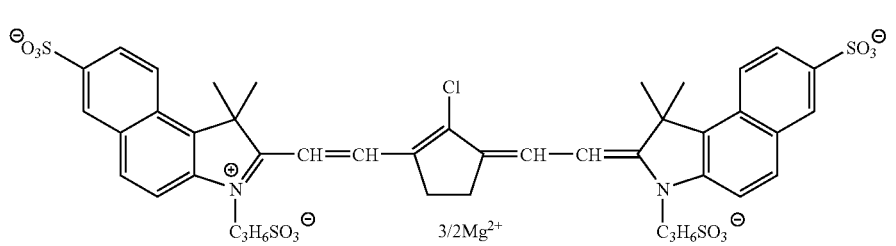
(1-16)
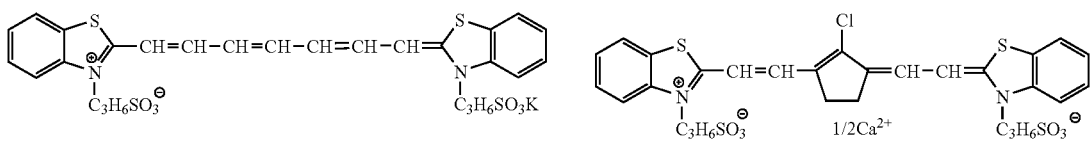
(1-17) (1-18)
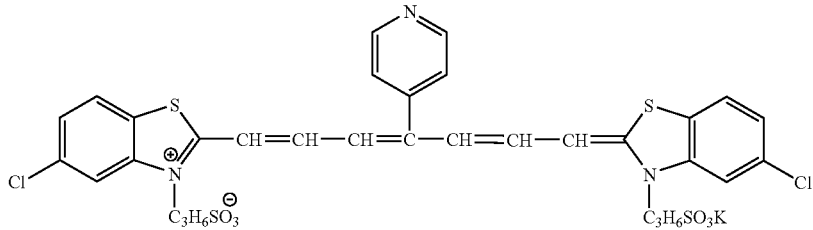
(1-19)

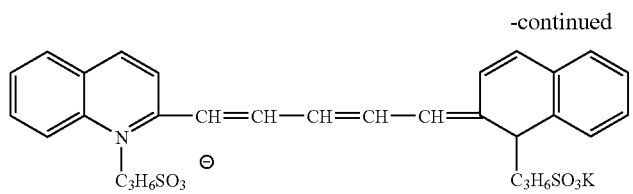
(1-20)

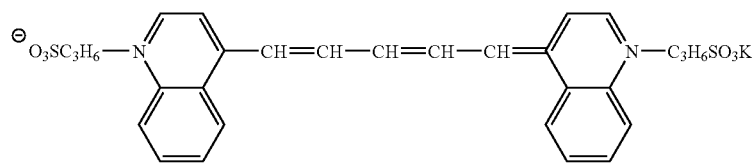
(1-21)

The oxonol dye is defined by the following formula.

$$Ak=Lo-Ae$$

In the formula, Ak represents a keto-type acidic nucleus, Ae represents an enol-type acidic nucleus, and Lo represents a methine chain constituted of an odd number of methine.

The oxonol dye represented by the following formula (2) can be preferably used (especially in the state of association).

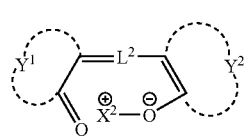
(II)

In the formula (2), $Y^1$ and $Y^2$ each independently represent a group of non-metal atom(s) necessary to complete an aliphatic ring or a heterocycle. A heterocycle is more preferable than an aliphatic ring. Examples of the aliphatic ring include an indandione ring. Examples of the heterocycle include a 5-pyrazolone ring, an isoxazolone ring, a barbituric acid ring, a pyridone ring, a rhodanine ring, a pyrazolidinedione ring, a pyrazolopyridone ring, and a meldrumic acid ring. The aliphatic ring and the heterocycle each may have a substituent. The substituent has the same meaning as the substituent of the nitrogen-containing heterocycle of $Z^1$ and $Z^2$ described above. $Y^1$ and $Y^2$ are preferably a 5-pyrazolone ring and a barbituric acid ring, especially preferably a barbituric acid ring.

$L^2$ is a methine chain constituted of an odd number of methine. The number of methine is preferably 3, 5 or 7. Among these odd numbers, 5 is most preferable. The methine group may have a substituent. The methine group having a substituent is preferably a methine group located at the center (i.e., a methine group located at the meso position). Examples of the substituent are similar to those of the substituent of the alkyl group described above. Two substituents on a methine chain may bond together, to form a 5- or 6-membered ring.

$X^2$ is a hydrogen atom or a cation. Examples of the cation include an alkali metal (e.g., Na, K) ion. Further, preferable examples of a cation include alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cl^{2+}$, $Zn^{2+}$), other metal ions (e.g., $Al^{3+}$), ammonium ion, triethyl ammonium ion, tributyl ammonium ion, pyridinium ion, and tetrabutyl ammonium ion. More preferred are alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cu^{2+}$, $Zn^{2+}$) and other metal ions (e.g., $Al^{3+}$). Especially preferred are $Mg^{2+}$, $Ca^{2+}$ and $Zn^{2+}$.

The oxonol dye used in the present invention may contains a carboxyl group (or a salt thereof) or a sulfo group (or a salt thereof). The cation forming the counter salt include the same as the above.

Examples of the oxonol dye represented by the formula (2) are shown below, but the invention is not limited to these.

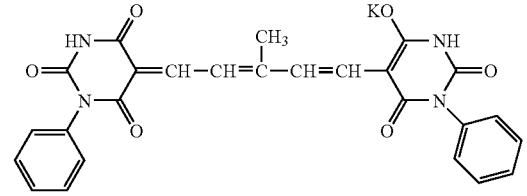
(2-1)

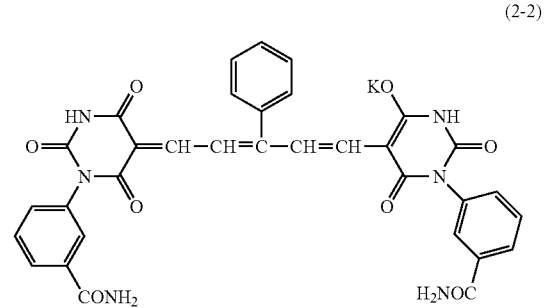
(2-2)

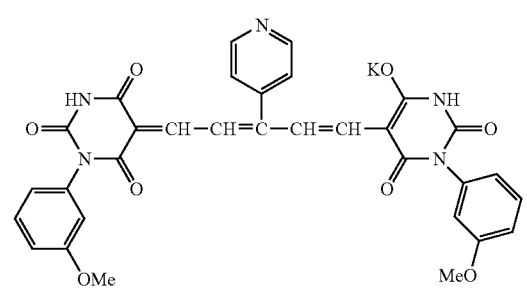
(2-3)

-continued (2-4)
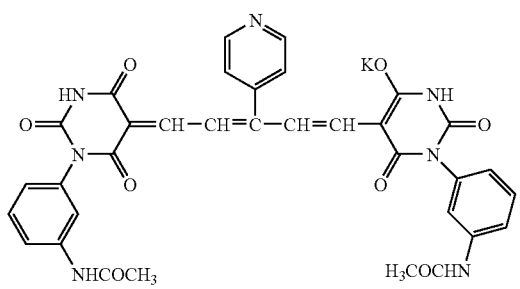

(2-6)
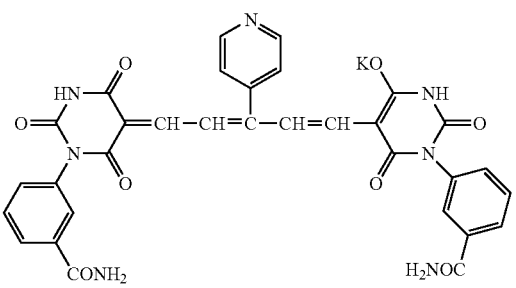

(2-5)
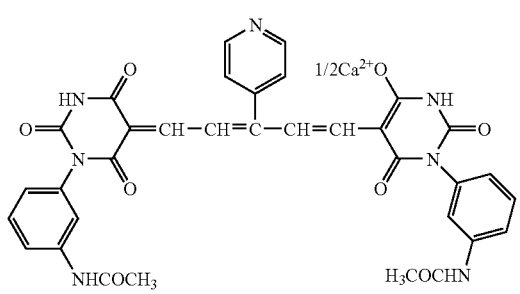

As a squarylium dye and a croconium dye, there can be used those dyes described in publications such as JP-A-2002-122729, U.S. Pat. No. 3,590,694, and JP-A-2001-226618.

Each substituent of the squarylium dye represented by the formula (III) and the croconium dye represented by the formula (IV) has the same meanings as in the formula (I). Further, the squarylium dyes and croconium dyes may contain a carboxyl group (or a salt thereof) or a sulfo group (or a salt thereof). Preferable examples of a cation forming the counter salt include alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cu^{2+}$, $Zn^{2+}$), other metal ions (e.g., $Al^{3+}$), ammonium ion, triethyl ammonium ion, tributyl ammonium ion, pyridinium ion, and tetrabutyl ammonium ion. Especially preferred are alkali earth metal ions (e.g., $Mg^{2+}$, $Ca^{2+}$, $Ba^{2+}$, $Sr^{2+}$), transition metal ions (e.g., $Ag^+$, $Fe^+$, $Co^{2+}$, $Ni^{2+}$, $Cu^{2+}$, $Zn^{2+}$) and other metal ions (e.g., $Al^{3+}$).

Examples of the squarylium dye and croconium dye are shown below, but the invention is not limited to these.

(3-1)
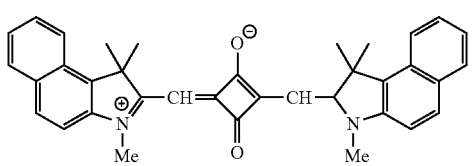

(3-7)
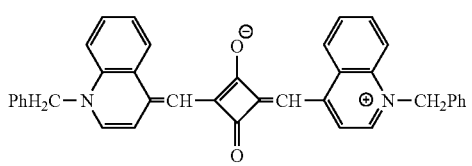

(3-2)
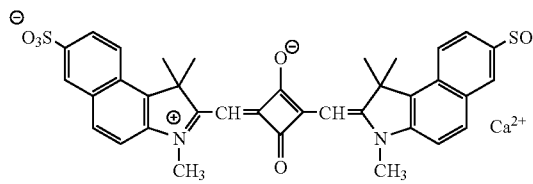

(3-8)
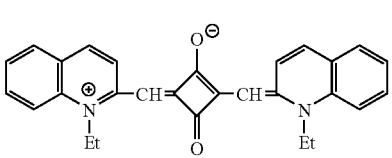

(3-3)
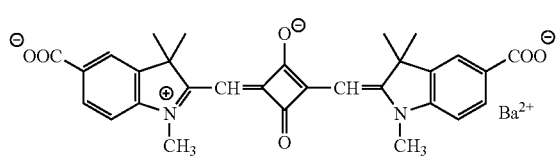

(3-9)
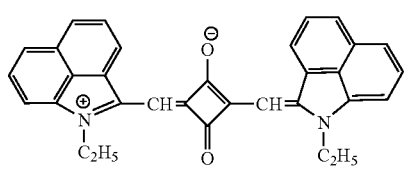

-continued
(3-4)
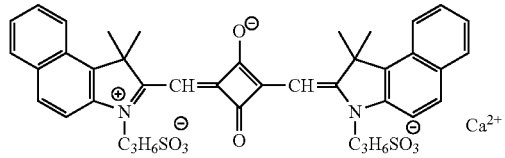
(3-10)
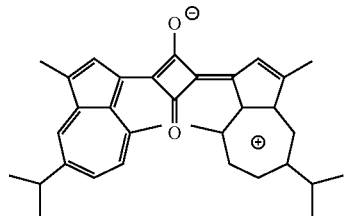
(3-5)
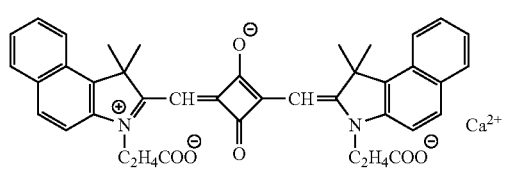
(3-11)
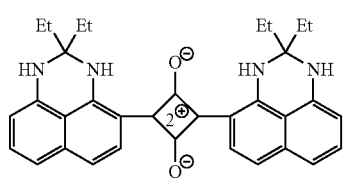
(3-6)
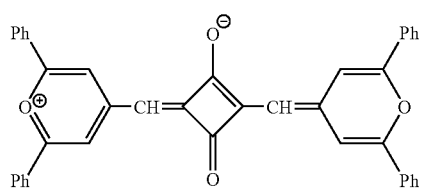
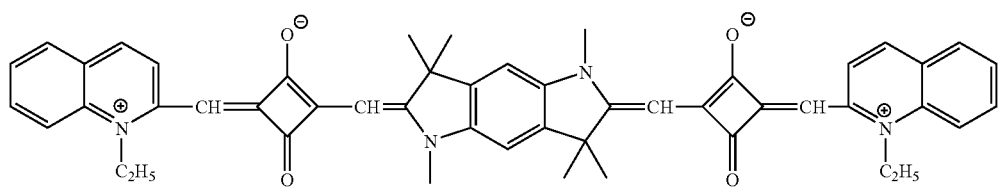
(3-12)
(4-1)
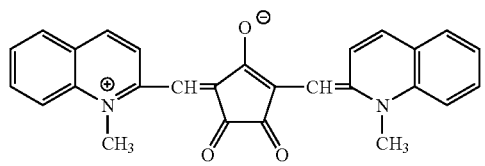
(4-4)
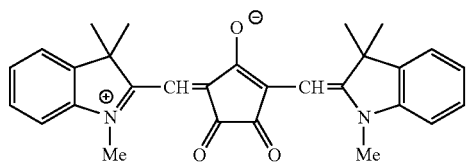
(4-2)
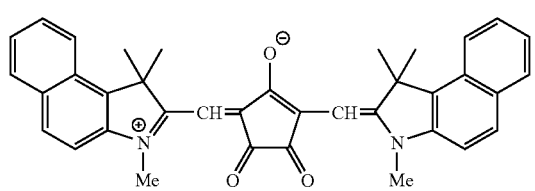
(4-5)
(4-3)
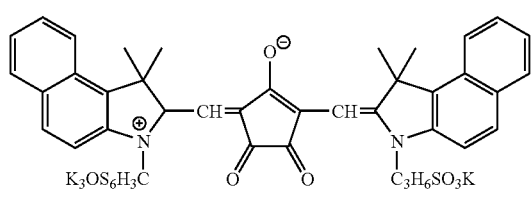
(4-6)
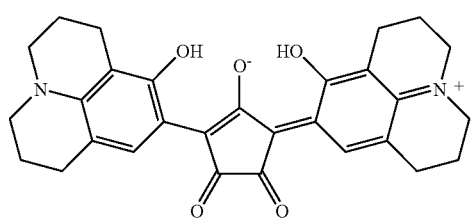

For the details of method for the synthesis of the cyanine dyes, reference can be made to F. M. Harmer, "Heterocyclic Compounds—Cyanine Dyes and Related Compounds", John Wiley & Sons, New York, London (1964); D. M. Sturmer, "Heterocyclic Compounds—Special Topics in Heterocyclic Chemistry", Chapter 18, Section 14, pp. 482-515, John Wiley & Sons, New York, London (1977); "Rodd's Chemistry of Carbon Compounds", 2nd Ed., Vol. IV, part B, Chapter 15, pp. 369-422, Elsevier Science Publishing Company Inc., New York (1977); JP-A-6-313939, JP-A-5-88293, and literatures cited in these references.

The oxonol dye may be synthesized with reference to publications such as JP-A-7-230671, European patent No. 0778493 and U.S. Pat. No. 5,459,265.

The squarylium dye and the croconium dye may be synthesized with reference to publications such as JP-A-2002-122729, U.S. Pat. No. 3,590,694, and JP-A-2001-226618.

<Solid Dispersion>

Some dye compounds proceed to the state of association simply by being dissolved in water. However, in general, the associated product of a dye can be formed by adding gelatin or a salt (e.g., barium chloride, potassium chloride, sodium chloride and calcium chloride) to an aqueous solution of the dye. The method of adding gelatin to the aqueous solution of the dye is preferable. It is further preferable to obtain an associated product of a lake dye by dispersing the lake dye.

The associated product of a dye may be formed as a dispersion of solid fine-particles of the dye. The solid dispersion is minutely described in, for example, "Ganryou Bunsan Gijyutsu—hyoumenshori to Bunsanzai no Tsukaikata oyobi Bunsanseihyouka—(Technology of Pigment Dispersion—Surface treatment and the way of using a dispersant and evaluation of dispersion properties—)" edited by Kabushiki kaisha Gijutsu Jouhoukyoukai; "Ganryou no Jiten (A cyclopedia of pigment)" edited by Kabushiki kaisha Asakura Shoten; and "Saisin [Ganryou Bunsan] jitsumu Nouhau-Jireisyu (The newest [Pigment Dispersion] Practical know-how and Case examples" edited by Kabushiki kaisha Gijutsu Jouhoukyoukai. In order to obtain the dispersion of solid fine-particles, a known dispersion device can be used. Examples of such a dispersion device include ball mill, vibration ball mill, planetary ball mill, sand mill, colloid mill, jet mill and roller mill. JP-A-52-92716 and WO88/074794 disclose such dispersion devices. It is preferable to employ a medium dispersion device of upright or lateral type.

The dispersion described above may be carried out under the presence of an appropriate medium (e.g., water, an alcohol, an cyclohexanone, 2-methoxy-1-methylethylacetate). It is preferable that a surfactant for dispersion is used together. As the surfactant for dispersion, an anionic surfactant (as disclosed in JP-A-52-92716 and WO88/074794) is preferably used. An anionic polymer, a nonionic surfactant or a cationic surfactant may optionally be used.

Powder in the fine-particle state can be obtained by dissolving the dye in an appropriate solvent and then adding a poor solvent thereto. The aforementioned surfactant for dispersion may be used in this case, as well. Alternatively, microcrystals of the dye can be deposited by dissolving the dye in a solvent by adjusting the pH value of the solution, and then changing the pH. The microcrystals thus obtained are also composed of the associated product of the dye.

In a case in which the dye in the state of association is fine-particles (or microcrystals), the average particle diameter is generally 1000 µm or less, preferably 0.001 µm to 100 µm, more preferably 0.005 µm to 50 µm.

To the present composition, a dispersant for pigments and a surfactant for enhancing the dispersibility of dyes can be added. Such a dispersant can be selected from a wide variety of conventional dispersants, including phthalocyanine derivatives (e.g., EFKA-745, a commercial product of EFKA); organosiloxane polymers (e.g., KP341, produced by Shin-etsu Chemical Industry Co., Ltd.); (meth)acrylic (co) polymers (e.g., Polyflow No. 75, No. 90 and No. 95, produced by Kyoei-sha Yushi Kagaku Kogyo); cationic surfactants (e.g., W001, produced by Yusho); nonionic surfactants, such as polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate and sorbitan fatty acid esters; anionic surfactants, such as W004, W005 and W017 (produced by Yusho); polymeric dispersants, such as EFKA-46, EFKA-47, EFKA-47EA, EFKA POLYMER 100, EFKA POLYMER 400, EFKA POLYMER 401 and EFKA POLYMER 450 (which are products of Morishita Industries Co., Ltd.), and Disperse Aid 6, Disperse Aid 8, Disperse Aid 15 and Disperse Aid 9100 (which are products of San-Nopco); various kinds of solsperse dispersants, such as Solsperse 3000, 5000, 9000, 12000, 13240, 13940, 17000, 24000, 26000 and 28000 (produced by Zeneka); ADEKA PLURONIC L31, F38, L42, L44, L61, L64, F68, L72, P95, F77, P84, F87, P94, L101, P103, F108, L121, P-123 (product by Asahi Denka Co., Ltd.) and Isonet S-20 (produced by Sanyo Chemical Industries Co., Ltd.).

Any one of known dispersants may be used as the dispersant as it is properly selected, and examples thereof include cationic surfactants, fluorochemical surfactants, polymer dispersants, and the like.

In addition, the graft copolymers described in JP-A-10-254133 containing a monomer moiety having a particular acid amido group or a monomer moiety having a quaternary ammonium salt group as the main chain unit are effective in finely dispersing the pigment, and may be used as the dispersant. By using the graft copolymer above it is possible to disperse the pigment finely while the consumption of energy and time is reduced, to prevent aggregation and sedimentation of the dispersed pigment over time, and to keep the dispersion stable for an extended period of time.

These dispersants may be used alone or as a mixture of two or more thereof. In the pigment dispersion, they are generally used in an amount of 1 to 150 parts by mass per 100 parts by mass of pigment.

<Binder>

The following is an explanation of a binder. Any binder can be used in the present invention, in so far as the binder, when mixed with a near infrared-absorbing dye, achieves a uniform coating without separation. The binder is preferably selected from the viewpoints such as thermal resistance and availability.

The binder is preferably a linear organic polymer that is soluble in water or organic solvent. Further, the binder is also preferably for pattern formation the organic polymer that is developable with a weak alkali aqueous solution. Examples of the linear organic polymer include a gelatin and a polymer having a carboxylic acid on a side chain, such as a methacrylic acid copolymer, an acrylic acid copolymer, an itaconic acid copolymer, a crotonic acid copolymer, a maleic acid copolymer and a partially esterified maleic acid copolymer, described, for example, in JP-A-59-44615, JP-B-54-34327 ("JP-B" means examined Japanese patent publication), JP-B-58-12577 and JP-B-54-25957, and JP-A-59-53836 and JP-A-

59-71048, and also, an acidic cellulose derivative having a carboxylic acid on a side chain is useful.

In addition to the foregoing, a polymer obtained by adding an acid anhydride to a polymer having a hydroxyl group, a polyhydroxystyrene resin, a polysiloxane resin, poly(2-hydroxyethyl(meth)acrylate), polyvinylpyrrolidone, polyethyleneoxide and polyvinyl alcohol are also useful.

A monomer having a hydrophilic group may be copolymerized, and examples thereof include alkoxyalkyl(meth)acrylate, hydroxyalkyl(meth)acrylate, glycerol(meth)acrylate, (meth)acrylamide, N-methylolacrylamide, secondary or tertiary alkylacrylamide, dialkylaminoalkyl(meth)acrylate, morpholine(meth)acrylate, N-vinylpyrrolidone, N-vinylcaprolactam, vinylimidazole, vinyltriazole, methyl(meth)acrylate, ethyl(meth)acrylate, branched or linear propyl(meth)acrylate, branched or linear butyl(meth)acrylate and phenoxyhydroxypropyl(meth)acrylate.

Furthermore, a monomer having a tetrahydrofurfuryl group, phosphoric acid, a phosphate ester, a quaternary ammonium salt, an ethyleneoxy chain, a propyleneoxy chain, sulfonic acid or a salt thereof, or a morpholinoethyl group is also useful as the monomer having a hydrophilic group.

A polymerizable group may be present on the side chain thereof for improving the crosslinking efficiency, and a polymer containing an allyl group, a (meth)acryl group or an allyloxyalkyl group on the side chain is also useful. Examples of the above-described polymer containing a polymerizable group include KS resist-106 (a product of Osaka Organic Chemical Industry) and CYCLOMER P Series (a product of Daicel Chemical Industries). In order to improve the strength of the cured film, alcohol-soluble nylon and a polyether of 2,2-bis(4-hydroxyphenyl)propane and epichlorohydrin are useful.

Among these various kinds of binders, a polyhydroxystyrene resin, a polysiloxane resin, an acrylic resin, an acrylamide resin and an acrylic/acrylamide copolymer resin are preferred from the standpoint of heat resistance, and an acrylic resin, an acrylamide resin and an acrylic/acrylamide copolymer resin are preferred from the standpoint of controllability of developing property.

Examples of the acrylic resin include a copolymer of a monomer selected from benzyl(meth)acrylate, (meth)acrylic acid, hydroxyethyl(meth)acrylate, and (meth)acrylamide; KS resist-106 (a product of Osaka Organic Chemical Industry) and CYCLOMER P Series (a product of Daicel Chemical Industries).

The binder is preferably a polymer having a weight average molecular weight (polystyrene conversion value measured with GPC method) of 1,000 to $2 \times 10^5$, more preferably a polymer having that of 2,000 to $1 \times 10^5$, and particularly preferably a polymer having of 5,000 to $5 \times 10^4$.

The content of the binder is preferably from 10 to 90% by mass, more preferably from 20 to 80% by mass, and particularly preferably from 30 to 70% by mass, based on the total solid content (by mass) of the composition.

<Free-Radical Polymerizable Monomer>

A free-radical polymerizable monomer will be described below. As the free-radical polymerizable monomer, preferred is a compound having at least one addition polymerizable ethylenical double bond and having a boiling point of 100° C. or more at a normal pressure and an ethylenical unsaturated group. When these free-radical polymerizable monomers are contained with a hereinafter-described photo-polymerization initiator in a near infrared-absorbing dye-containing curable composition, they enable to make the composition negative working.

Examples thereof include a monofunctional acrylate or methacrylate, such as polyethylene glycol mono(meth)acrylate, polypropylene glycol mono(meth)acrylate and phenoxyethyl(meth)acrylate. Examples thereof also include a polyfunctional acrylate or methacrylate, such as polyethylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol penta(meth)acrylate, dipentaerythritol hexa(meth)acrylate, hexanediol(meth)acrylate, trimethylolpropane tri(acryloyloxypropyl)ether, tri(acryloyloxyethyl)isocyanurate; a compound obtained by adding ethylene oxide or propylene oxide to a polyhydric alcohol, such as glycerin and trimethylolethane, and then converted to a (meth)acrylate; urethane acrylate compounds described in JP-B-48-41708, JP-B-50-6034 and JP-A-51-37193; polyester acrylate compounds described in JP-A-48-64183, JP-B-49-43191 and JP-B-52-30490; an alicyclic solid epoxy resin; and an epoxy acrylate compound, which is a reaction product of an epoxy resin and (meth)acrylic acid. Examples thereof also include a mixture of the monofunctional(meth)acrylates and/or the polyfunctional(meth)acrylates. Examples thereof further include compounds indicated as a photocurable monomer and oligomer in Journal of Adhesion Society of Japan, Vol. 20, No. 7, p. 300-308.

The total content of the free-radical polymerizable monomer in the curable composition is preferably from 0.1 to 90% by mass, more preferably from 1.0 to 80% by mass, and particularly preferably from 2.0 to 70% by mass, based on the solid content (by mass) of the composition.

<Photopolymerization Initiator>

A photopolymerization initiator will be described below. In the case where a negative dye-containing curable composition is constituted, a photopolymerization initiator can be contained with the free-radical polymerizable monomer. The photopolymerization initiator is not particularly limited as far as it can initiate a polymerization reaction of the free-radical polymerizable monomer, and is preferably selected from the standpoint of characteristics, initiation efficiency, absorption wavelength, availability, cost and safety.

The photo-polymerization initiator used in the present invention is composed of two or more kinds of initiators in combination, and needs to have characteristics of the following initiator A or B. The initiator contains at least one kind of each of the initiators A and B.

Examples thereof include at least one active halogen compound selected from a halomethyloxadiazole compound and a halomethyl-s-triazine compound, a 3-aryl-substituted coumarin compound, a lophine dimer, a benzophenone compound, an acetophenone compound and a derivative thereof, a cyclopentadiene-benzene-iron complex and a salt thereof, and an oxime compound.

Examples of the active halogen compound as the halomethyloxadiazole compound include 2-halomethyl-5-vinyl-1,3,4-oxadiazole compound described in JP-B-57-6096, 2-trichloromethyl-5-styryl-1,3,4-oxadiazole, 2-trichloromethyl-5-(p-cyanostyryl)-1,3,4-oxadiazole and 2-trichloromethyl-5-(p-methoxystyryl)-1,3,4-oxadiazole.

Examples of the active halogen compound as the halomethyl-s-triazine compound include a vinylhalomethyl-s-triazine compound described in JP-B-59-1281, and a 2-(naphtho-1-yl)-4,6-bishalomethyl-s-triazine compound and a 4-(p-aminophenyl)-2,6-dihalomethyl-s-triazine compound described in JP-A-53-133428.

Specific examples thereof include 2,4-bis(trichloromethyl)-6-p-methoxystyryl-s-triazine, 2,6-bis(trichloromethyl)-4-(3,4-methylenedioxyphenyl)-1,3,5-triazine, 2,6-bis (trichloromethyl)-4-(4-methoxyphenyl)-1,3,5-triazine, 2,4-bis(trichloromethyl)-6-(1-p-dimethylaminophenyl-1,3-butadienyl)-s-tri-azine, 2-trichloromethyl-4-amino-6-p-methoxystyryl-s-triazine, 2-(naphtho-1-yl)-4,6-bistrichloromethyl-s-triazine, 2-(4-methoxynapto-1-yl)-4,6-bistrichloromethyl-s-triazine, 2-(4-ethoxynaphto-1-yl)-4,6-bistrichloromethyl-s-triazine, 2-(4-butoxynaphto-1-yl)-4,6-bistrichloromethyl-s-triazine, 2-(4-(2-methoxyethyl)-naphto-1-yl)-4,6-bistrichloromethyl-s-triazine, 2-(4-(2-ethoxyethyl)-naphtho-1-yl)-4,6-bistrichloromethyl-s-triazine, 2-(4-(2-butoxyethyl)-naphtho-1-yl)-4,6-bistrichloromethyl-s-triazine, 2-(2-methoxynaphtho-1-yl)-4,6-bistrichloromethyl-s-triazine, 2-(6-methoxy-5-methylnaphtho-2-yl)-4,6-bistrichloromethyl-s-triazine, 2-(6-methoxynaphtho-2-yl)-4,6-bistrichloromethyl-s-triazine, 2-(5-methoxynaphtho-1-yl)-4,6-bistrichloromethyl-s-triazine, 2-(4,7-dimethoxynaphtho-1-yl)-4,6-bistrichloromethyl-s-triazine, 2-(6-ethoxynaphtho-2-yl)-4,6-bistrichloromethyl-s-triazine, 2-(4,5-dimethoxynaphtho-1-yl)-4,6-bistrichloromethyl-s-triazine, 4-(p-N,N-di (ethoxycarbonylmethyl)aminophenyl)-2,6-di (trichloromethyl)-s-triazine, 4-(o-methyl-p-N,N-di (ethoxycarbonylmethyl)aminophenyl)-2,6-di (trichloromethyl)-s-triazine, 4-(p-N,N-di(chloroethyl) aminophenyl)-2,6-di(trichloromethyl)-s-triazine, 4-(o-methyl-p-N,N-di(chloroethyl)aminophenyl)-2,6-di (trichloromethyl)-s-triazine, 4-(p-N-chloroethylaminophenyl)-2,6-di(trichloromethyl)-s-triazine, 4-(p-N-ethoxycabonylmethylaminophenyl)-2,6-di(trichloromethyl)-s-triazine, 4-(p-N,N-di(phenyl)aminophenyl)-2,6-di(trichloromethyl)-s-triazine, 4-(p-N-chloroethylcarbonylaminophenyl)-2,6-di(trichloromethyl)-s-triazine, 4-(p-N-(p-methoxyphenyl)carbonylaminophenyl)-2,6-di (trichloromethyl)-s-triazine, 4-(m-N,N-di (ethoxycarbonylmethyl)aminophenyl)-2,6-di (trichloromethyl)-s-triazine, 4-(m-bromo-p-N,N-di (ethoxycarbonylmethyl)aminophenyl)-2,6-di (trichloromethyl)-s-triazine, 4-(m-chloro-p-N,N-di (ethoxycarbonylmethyl)aminophenyl)-2,6-di (trichloromethyl)-s-triazine, 4-(m-fluoro-p-N,N-di (ethoxycarbonylmethyl)aminophenyl)-2,6-di (trichloromethyl)-s-triazine, 4-(o-bromo-p-N,N-di (ethoxycarbonylmethyl)aminophenyl)-2,6-di (trichloromethyl)-s-triazine, 4-(o-chloro-p-N,N-di (ethoxycarbonylmethyl)aminophenyl)-2,6-di (trichloromethyl)-s-triazine, 4-(o-fluoro-p-N,N-di (ethoxycarbonylmethyl)aminophenyl-2,6-di (trichloromethyl)-s-triazine, 4-(o-bromo-p-N,N-di (chloroethyl)aminophenyl-2,6-di(trichloromethyl)-s-triazine, 4-(o-chloro-p-N,N-di(chloroethyl)aminophenyl)-2, 6-di(trichloromethyl)-s-triazine, 4-(o-fluoro-p-N,N-di (chloroethyl)aminophenyl)-2,6-di(trichloromethyl)-s-triazine, 4-(m-bromo-p-N,N-di(chloroethyl)aminophenyl)-2,6-di(trichloromethyl)-s-triazine, 4-(m-chloro-p-N,N-di (chloroethyl)aminophenyl)-2,6-di(trichloromethyl)-s-triazine, 4-(m-fluoro-p-N,N-di(chloroethyl)aminophenyl)-2, 6-di(trichloromethyl)-s-triazine, 4-(m-bromo-p-N-ethoxycarbonylmethylaminophenyl)-2,6-di (trichloromethyl)-s-triazine, 4-(m-chloro-p-N-ethoxycarbonylmethylaminophenyl)-2,6-di (trichloromethyl)-s-triazine, 4-(m-fluoro-p-N-ethoxycarbonylmethylaminophenyl)-2,6-di (trichloromethyl)-s-triazine, 4-(o-bromo-p-N-ethoxycarbonylmethylaminophenyl)-2,6-di (trichloromethyl)-s-triazine, 4-(o-chloro-p-N-ethoxycarbonylmethylaminophenyl)-2,6-di (trichloromethyl)-s-triazine, 4-(o-fluoro-p-N-ethoxycarbonylmethylaminophenyl)-2,6-di (trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di (trichloromethyl)-s-triazine and 4-(o-fluoro-p-N-chloroethylaminophenyl)-2,6-di(trichloromethyl)-s-triazine.

Also usefully used include TAZ series (such as TAZ-104, TAZ-107, TAZ-109, TAZ-110, TAZ-113, TAZ-123, TAZ-140 and TAZ-204), produced by Midori Kagaku Co., Ltd., T series (such as T-OMS, T-BMP, T-R and T-B), produced by PANCHIM, Inc., IRGACURE series (such as IRGACURE 149, IRGACURE 184, IRGACURE 261, IRGACURE 500, IRGACURE 651, IRGACURE 819 and IRGACURE 1000) and DAROCURE series (such as DAROCURE 1173), produced by Ciba-Geigy Ltd., 4,4'-bis(diethylamino)-benzophenone, 2-(O-benzoyloxime)-1-(4-(phenylthio)phenyl)-1,2-octadione, 2-benzyl-2-dimethylamino-4-morpholinobutylophenone, 2,2-dimethoxy-2-phenylacetophenone, a 2-(o-chlorophenyl)-4,5-diphenylimidazolyl dimer, a 2-(o-fluorophenyl)-4,5-diphenylimidazolyl dimer, a 2-(o-methoxyphenyl)-4,5-diphenylimidazolyl dimer, a 2-(p-methoxyphenyl)-4,5-diphenylimidazolyl dimer, a 2-(p-dimethoxyphenyl)-4,5-diphenylimidazolyl dimer, a 2-(2,4-dimethoxyphenyl)-4,5-diphenylimidazolyl dimer, a 2-(p-methylmercaptophenyl)-4, 5-diphenylimidazolyl dimer and benzoin isopropyl ether.

The photopolymerization initiator may be used in combination with a sensitizer and a photostabilizer.

Examples thereof include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-ethoxyxanthone, thioxanthone, 2,4-diethylthioxanthone, acridone, 10-butyl-2-chloroacridone, benzyl, dibenzylacetone, p-(dimethylamino)phenylstyryl ketone, p-(dimethylamino)phenyl-p-methyl styryl ketone, benzophenone, p-(dimethylamino) benzophenone (or Michler's ketone), p-(diethylamino) benzophenone, benzoanthrone, a benzothiazole compound described in JP-B-51-48516, and TINUVIN 1130 and TINUVIN 400.

In the curable composition of the present invention, another known initiator may be contained in addition to the aforementioned photopolymerization initiator. Specific examples thereof include a vicinal polyketaldonyl compound described in U.S. Pat. No. 2,367,660, α-carbonyl compounds described in U.S. Pat. Nos. 2,367,661 and 2,367,670, an acyloin ether described in U.S. Pat. No. 2,448,828, an aromatic acyloin compound substituted with an α-hydrocarbon described in U.S. Pat. No. 2,722,512, a multinuclear quinone compound described in U.S. Pat. Nos. 3,046,127, and 2,951, 758, a combination of a triallylimidazole dimer and p-aminophenyl ketone described in U.S. Pat. No. 3,549,367, and a benzothiazole compound and a trihalomethyl-s-triazine compound described in JP-B-51-48516.

The total content of the photopolymerization initiator (and the known initiator) is preferably from 0.01 to 50% by mass, more preferably from 1 to 30% by mass, and particularly preferably from 1 to 20% by mass, based on the solid content (by mass) of the free-radical polymerizable monomer components. If the total content thereof is less than 0.01% by mass, the polymerization may be difficult to proceed, and if it exceeds 50% by mass, the molecular weight may become small to reduce the film strength although the polymerization rate is large.

(Hardener)

In the invention, it is preferable to add a hardener when an epoxy resin is used as the heat-curable resin. There are an extremely great number of epoxy resin hardeners that are different in properties such as stability as a mixture of a resin and a hardener, viscosity, hardening temperature, hardening period, and heat generation, and thus, it is necessary to select a suitable hardener according to application, use condition, and work condition of the hardener. Such hardeners are described in detail in Hiroshi Kakiuchi Ed., "Epoxy Resins (Shokodo)", Chapter five. Examples of the hardeners include the followings: catalytic hardeners such as tertiary amines and boron trifluoride-amine complexes; hardeners chemically reacting quantitatively with the functional groups in epoxy resin such as polyamines and acid anhydrides; normal temperature-hardening hardeners such as diethylenetriamine and polyamide resins; medium-temperature hardening hardeners such as diethylaminopropylamine and tris(dimethylaminomethyl)phenol; and high temperature-hardening hardeners such as phthalic anhydride, meta-phenylenediamine; and the like. The hardeners, when seen from the chemical structure, include amines including aliphatic polyamines such as diethylenetriamine, aromatic polyamines such as meta-phenylenediamine, and secondary and tertiary amines such as tris(dimethylaminomethyl)phenol; acid anhydrides including phthalic anhydride, polyamide resins, polysulfide resins, boron trifluoride-monoethylamine complexes, initial-stage condensates, for example, of phenol resins, dicyandiamides, and the like.

These hardeners react, polymerize, and harden with epoxy groups by heating, accompanied with increase in crosslinking density. The content of the binder or the hardener is preferably as small as possible for reduction in film thickness, and in particular, the content of the hardener is preferably 35% by mass or less, more preferably 30% by mass or less, and still more preferably 25% by mass or less, with respect to the heat-curable resin.

(Curing Catalyst)

The lake dye-containing curable composition according to the invention may contain a curing catalyst. Examples of the curing catalysts favorable, when an epoxy resin is used as the curable resin, include imidazole compounds, boron trifluoride complexes (in particular, amine complexes), tertiary amines (guanidines and biguanides), titanate esters, and the like. Among them, imidazole compounds are preferable from the point of hardening rate. In addition, phosphine derivatives may also be used as the curing catalyst. The amount of the curing catalyst added is preferably small at approximately 1/10 to 1/1000 times, more preferably approximately 1/20 to 1/500 times, and still more preferably approximately 1/30 to 1/250 times by mass, with respect to the epoxy resin having an epoxy equivalence of approximately 150 to 200.

Specific examples of the curing catalysts include, but are not limited to, commercially available products such as Imidazole Silane series products: "IS-1000", "IS-1000D", "IM-1000, "SP-1000", "IA-1000A", "IA-1000P", "IA-100F", "IA-100AD", "IA-100FD", "IM-100F", "IS-3000", and "IS-4000" manufactured by Japan Energy Corporation; "1B2PZ" and "SFZ" manufactured by Shikoku Chemical Corporation.

<Crosslinking Agent>

In the present invention, more highly hardened film can be obtained supplementarily using a crosslinking agent. The following is an explanation of a crosslinking agent.

Therefore, the crosslinking agent used in the invention is not particularly limited as far as it is capable of exerting film curing through crosslinking and polymerization, and examples thereof include (a) an epoxy resin, (b) a melamine compound, a guanamine compound, a glycoluril compound or an urea compound, having been substituted with at least one substituent selected from a methylol group, an alkoxymethyl group and an acyloxymethyl group, and (c) a phenol compound, a naphthol compound or a hydroxyanthracene compound, having been substituted with at least one substituent selected from a methylol group, an alkoxymethyl group and an acyloxymethyl group. Among these, a multifunctional epoxy resin is preferable.

The epoxy resin (a) may be any compound that has an epoxy group and crosslinking property, and examples thereof include a divalent glycidyl group-containing low molecular weight compound, such as bisphenol A diglycidyl ether, ethylene glycol diglycidyl ether, butanediol diglycidyl ether, hexanediol diglycidyl ether, dihydroxybiphenyl diglycidyl ether, diglycidyl phthalate and N,N-diglycidylaniline; a trivalent glycidyl group-containing low molecular weight compound, such as trimethylolpropane triglycidyl ether, trimethylolphenol triglycidyl ether and Tris P-PA (trisphenol P-PA) triglycidyl ether; a tetravalent glycidyl group-containing low molecular weight compound, such as pentaerythritol tetraglycidyl ether and tetramethylolbisphenol A tetraglycidyl ether; a polyvalent glycidyl group-containing low molecular weight compound, such as dipentaerythritol pentaglycidyl ether and dipentaerythritol hexaglycidyl ether; and a glycidyl group-containing polymer compound, such as polyglycidyl(meth)acrylate and a 1,2-epoxy-4-(2-oxiranyl)cyclohexane adduct of 2,2-bis(hydroxymethyl)-1-butanol.

The number of a methylol group, an alkoxymethyl group and an acyloxymethyl group contained in and substituted on the crosslinking agent (b) is generally from 2 to 6 in the case of the melamine compound and from 2 to 4 in the case of the glycoluril compound, the guanamine compound and the urea compound, and is preferably from 5 to 6 in the case of the melamine compound and from 3 to 4 in the case of the glycoluril compound, the guanamine compound and the urea compound.

The melamine compound, the guanamine compound, the glycoluril compound and the urea compound (b) are referred to as a compound (a methylol group-containing compound, an alkoxymethyl group-containing compound or an acyloxymethyl group-containing compound) of the category (b).

The methylol group-containing compound of the category (b) can be obtained by heating an alkoxymethyl group-containing compound in an alcohol in the presence of an acid catalyst, such as hydrochloric acid, sulfuric acid, nitric acid and methanesulfonic acid. The acyloxymethyl group-containing compound of the category (b) can be obtained by mixing and stirring a methylol group-containing compound with an acyl chloride in the presence of a basic catalyst.

Specific examples of the compounds of the category (b) having the aforementioned substituent are shown below.

Examples of the melamine compound include hexamethylolmelamine, hexamethoxymethylmelamine, a compound obtained by methoxymethylating from 1 to 5 methylol groups of hexamethylolmelamine or a mixture thereof, hexamethoxyethylmelamine, hexaacyloxymethylmelamine, and a compound obtained by acyloxymethlating from 1 to 5 methylol groups of hexamethylolmelamine or a mixture thereof.

Examples of the guanamine compound include tetramethylolguanamine, tetramethoxymethylguanamine, a compound obtained by methoxymethylating from 1 to 3 methylol groups of tetramethylolguanamine or a mixture thereof, tetramethoxyethylguanamine, tetraacyloxymethylguanamine, and a compound obtained by acyloxymethylating from 1 to 3 methylol groups of tetramethylolguanamine or a mixture thereof.

Examples of the glycoluril compound include tetramethylolglycoluril, tetramethoxymethylglycoluril, a compound obtained by methoxymethylating from 1 to 3 methylol groups of tetramethylolglycoluril or a mixture thereof, and a compound obtained by acyloxymethylating from 1 to 3 methylol groups of tetramethylolglycoluril or a mixture thereof.

Examples of the urea compound include tetramethylolurea, tetramethoxymethylurea, a compound obtained by methoxymethylating from 1 to 3 methylol groups of tetramethylolurea or a mixture thereof, and tetramethoxyethylurea.

The compounds of the category (b) may be used solely or in combination thereof.

The crosslinking agent (c), i.e., a phenol compound, a naphthol compound or a hydroxyanthracene compound having been substituted with at least one substituent selected from a methylol group, an alkoxymethyl group and an acyloxymethyl group, exerts thermal crosslinking as similar to the crosslinking agent (b), so as to suppress intermixing with a photoresist as an upper layer and to improve the film strength. These compounds are sometimes referred to as a compound of the category (c) (a methylol group-containing compound, an alkoxymethyl group-containing compound or an acyloxymethyl group-containing compound).

The number of a methylol group, an alkoxymethyl group and an acyloxymethyl group contained in the crosslinking agent (c) is necessarily at least 2 per one molecule, and a compound having a phenol compound skeleton, all the 2-position and the 4-position of which have been substituted, is preferred from the standpoint of thermal crosslinking property and storage stability. Furthermore, a compound having a naphthol compound skeleton or a hydroxyanthracene compound skeleton, all the o-positions and the p-positions of which with respect to the hydroxyl group have been substituted, is also preferred. The 3-position or the 5-position of the phenol compound may either be unsubstituted or have a substituent, and in the naphthol compound, other positions than the o-positions with respect to the hydroxyl group may either be unsubstituted or have a substituent.

The methylol group-containing compound of the category (c) can be obtained by using a phenolic hydroxyl group-containing compound whose 2- or 4-position of the phenolic hydroxyl group is a hydrogen atom as a raw material and reacting it with formalin in the presence of a basic catalyst, such as sodium hydroxide, potassium hydroxide, ammonia and tetraalkylammonium hydroxide. The alkoxymethyl group-containing compound of the category (c) can be obtained by heating the methylol group-containing compound of the category (c) in an alcohol in the presence of an acid catalyst, such as hydrochloric acid, sulfuric acid, nitric acid and methanesulfonic acid. The acyloxymethyl group-containing compound of the category (c) can be obtained by reacting the methylol group-containing compound of the category (c) with an acyl chloride in the presence of a basic catalyst.

Examples of the skeleton compound of the crosslinking agent (c) include a phenol compound, a naphthol compound and a hydroxyanthracene compound, in which the o-positions and the p-positions of the phenolic hydroxyl group are unsubstituted, and examples thereof include phenol, isomers of cresol, 2,3-xylenol, 2,5-xylenol, 3,4-xylenol, 3,5-xylenol, a bisphenol compound such as bisphenol A, 4,4'-bishydroxybiphenyl, Tris P-PA (produced by Honshu Chemical Industry Co., Ltd.), naphthol, dihydroxynaphthalene and 2,7-dihydroxyanthracene.

As specific examples of the crosslinking agent (c), examples of the phenol compound include trimethylolphenol, tri(methoxymethyl)phenol, a compound obtained by methoxymethylating from 1 to 2 methylol groups of trimethylolphenol, trimethylol-3-cresol, tri(methoxymethyl)-3-cresol, a compound obtained by methoxymethylating from 1 to 2 methylol groups of trimethylol-3-cresol, a dimethylolcresol such as 2,6-dimethylol-4-cresol, tetramethylolbisphenol A, tetramethoxymethylbisphenol A, a compound obtained by methoxymethlating from 1 to 3 methylol groups of tetramethylolbisphenol A, tetramethylol-4,4'-bishydroxybiphenyl, tetramethoxymethyl-4,4'-bishydroxybiphenyl, a hexamethylol compound of TrisP-PA, a hexamethoxymethyl compound of Tris P-PA, a compound obtained by methoxymethylating from 1 to 5 methylol groups of a hexamethylol compound of Tris P-PA, and bishydroxymethylnaphthalenediol.

Examples of the hydroxyanthracene compound include 1,6-dihydroxymethyl-2,7-dihydroxyanthracene, and examples of the acyloxymethyl group-containing compound include compounds obtained by acyloxymethylating a part or all of the methylol groups of the methylol group-containing compounds.

Preferred examples among these compounds include trimethylolphenol, bishydroxymethyl-p-cresol, tetramethylolbisphenol A, a hexamethylol compound of Tris P-PA (produced by Honshu Chemical Industry Co., Ltd.), and phenol compounds obtained by substituting the methylol groups of these compounds with an alkoxymethyl group and both a methylol group and an alkoxymethyl group.

The compound of the category (c) may be used solely or in combination thereof.

The total content of the crosslinking agents in the near infrared-absorbing dye-containing curable composition is, while it varies depending on the material thereof, preferably from 0 to 70% by mass, more preferably from 0 to 50% by mass, and particularly preferably from 0 to 30% by mass, based on the solid content (by mass) of the composition. The crosslinking agents can also be use as a binder.

<Organic Solvent>

When the curable composition of the present invention is prepared using an organic solvent, at least one kind of the organic solvent is contained. The organic solvent is not particularly limited as far as it satisfies solubility to the respective components and coating property of the dye-containing curable composition, and it is preferably selected under particular consideration of the dispersibility of the dye or binder, the solubility, the coating property and the safety.

Preferred examples of the solvent include an ester compound such as an alkyl ester, e.g., ethyl acetate, n-butyl acetate, isobutyl acetate, amyl formate, isoamyl acetate, isobutyl acetate, butyl propionate, isopropyl butyrate, ethyl butyrate, butyl butyrate, an alkyl ester compound, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate and ethyl ethoxyacetate; an alkyl 3-oxypropionate compound such as methyl 3-oxypropionate and ethyl 3-oxypropionate, for example, methyl 3-methoxypropionate, ethyl 3-methoxypropionate, methyl 3-ethoxypropionate and ethyl 3-ethoxypropionate; an alkyl 2-oxypropionate compound, such as methyl 2-oxypropionate, ethyl 2-oxypropionate and propyl 2-oxypropionate, for example, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate and ethyl 2-ethoxy-2-methylpropionate, methyl pyruvate, ethyl pyruvate, propyl pyruvate, methyl acetoacetate, ethyl acetoacetate, methyl 2-oxobutanoate and ethyl 2-oxobutanoate; an ether compound such as diethylene glycol dimethyl ether, tetrahydrofuran, ethylene glycol monomethyl ether, ethylene glycol monoethyl ether, methylcellosolve acetate, ethylcellosolve acetate, diethylene glycol monomethyl ether, diethylene glycol monoethyl ether, diethylene glycol monobutyl ether, propylene glycol monomethyl ether, propylene glycol monomethyl ether acetate, propylene glycol monoethyl ether acetate, and propylene glycol monopropyl ether acetate; a ketone compound such as methyl ethyl ketone, cyclohexanone, 2-heptanone and 3-heptanone; and an aromatic hydrocarbon compound such as toluene and xylene.

<Various Kinds of Additives>

Various kinds of additives may be added to the near infrared-absorbing dye-containing curable composition of the invention depending on necessity, such as a filler, a polymer compound other than those described in the foregoing, a surfactant, an adhesion accelerating agent, an antioxidant, an ultraviolet ray absorbing agent and an aggregation preventing agent.

Examples of the additives include a filler, such as glass and alumina; a polymer compound other than the binder resin, such as polyvinyl alcohol, polyacrylic acid, polyethylene glycol monoalkyl ether and polyfluoroalkyl acrylate; a surfactant, such as a nonionic surfactant, a cationic surfactant and an anionic surfactant; an adhesion accelerating agent, such as vinyltrimethoxysilane, vinyltriethoxysilane, vinyltris(2-methoxyethoxy) silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane and 3-mercaptopropyltrimethoxysilane; an antioxidant, such as 2,2-thiobis(4-methyl-6-t-butylphenol) and 2,6-di-t-butylphenol; an ultraviolet ray absorbing agent, such as 2-(3-t-butyl-5-methyl-2-hydroxyphenyl)-5-chlorobenzotriazole and alkoxybenzophenone; and an aggregation preventing agent, such as sodium polyacrylate.

In order to accelerate the dissolution of the non-image area to an alkali solution to attain further improvement of the developing property of the dye-containing curable composition of the invention, an organic carboxylic acid, preferably a low molecular weight organic carboxylic acid having a molecular weight of 1,000 or less, may be added to the composition.

Specific examples thereof include an aliphatic monocarboxylic acid, such as formic acid, acetic acid, propionic acid, butyric acid, valeric acid, pivalic acid, caproic acid, diethylacetic acid, enanthic acid and caprylic acid; an aliphatic dicarboxylic acid, such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; an aliphatic tricarboxylic acid, such as tricarballylic acid, aconitic acid and camphoronic acid; an aromatic monocarboxylic acid, such as benzoic acid, toluic acid, cuminic acid, hemellitic acid and mesitylenic acid; an aromatic polycarboxylic acid, such as phthalic acid, isophthalic acid, terephthalic acid, trimellitic acid, trimesic acid, mellophanic acid and pyromellitic acid; and other carboxylic acids, such as phenylacetic acid, hydratropic acid, hydrocinnamic acid, mandelic acid, phenylsuccinic acid, atropic acid, cinnamic acid, methyl cinnamate, benzyl cinnamate, cinnamylideneacetic acid, coumaric acid and umbellic acid.

[Near Infrared-Absorbing Filter and Method of Producing the Same]

The near infrared-absorbing filter of the present invention can form a heat or light-induced hardened film and may form a pattern in the same manner as a color filter. A method of producing a pattern is described in detail below.

In the method of producing a near infrared-absorbing filter for pattern formation with an alkali developer, according to the present invention, there is used the above-described near infrared-absorbing dye-containing curable composition of the present invention.

The near infrared-absorbing dye-containing curable composition is coated on a support by a coating method, such as spin coating, flow coating and roll coating, to form a radiation sensitive composition layer, which is then exposed through a prescribed mask pattern, followed by being developed with a developer, to form a negative colored pattern (image forming step). The process may further contain, depending on necessity, a curing step for curing the thus formed colored pattern by heating and/or exposure.

Upon production of the near infrared-absorbing filter, a color filter having prescribed hues can be produced by repeating, in the number of the hues, the image forming step (and the curing step depending on necessity). As light or a radiation used herein, an ultraviolet ray, such as g-line, h-line and i-line, is particularly preferably used.

Examples of the support include soda glass, PYREX (registered trademark) glass and quartz glass, which are used in a liquid crystal display device or the like, and those having a transparent electroconductive film adhered, and a photoelectric conversion element substrate, such as a silicon substrate, and a complementary metallic oxide semiconductor (CMOS), which are used in a solid state imaging device or the like. There are some cases where black stripes for separating pixels are formed on the support.

An undercoating layer may be provided, depending on necessity, on the support for improvement of adhesion to the upper layer, prevention of diffusion of substances, and planarization of the surface of the substrate.

The developer may be any one that has such a formulation that dissolves an uncured part of the near infrared-absorbing dye-containing curable composition of the invention but does not dissolve a cured part thereof. Specific examples thereof include a combination of various kinds of organic solvents and an alkali aqueous solution. Examples of the organic solvent include those having been described for preparation of the near infrared-absorbing dye-containing curable composition of the invention.

Preferred examples of the alkali aqueous solution include alkali aqueous solutions obtained by dissolving an alkali compound to a concentration of 0.001 to 10% by mass, and preferably from 0.01 to 1% by mass, wherein examples of the alkali compound include sodium hydroxide, potassium hydroxide, sodium carbonate, sodium silicate, sodium metasilicate, aqueous ammonia, ethylamine, diethylamine, dimethylethanolamine, tetramethylammonium hydroxide, tetraethylammonium hydroxide, choline, pyrrole, piperidine and 1,8-diazabicyclo-[5.4.0]-7-undecene. In the case where a developer containing the alkali aqueous solution is used, the layer thus developed is generally washed with water.

The near infrared-absorbing filter according to the invention is suitable for a liquid crystal display device and a solid state imaging device such as CCD, and particularly suitable for CCD or CMOS device of high resolution exceeding 1,000,000 pixels. The near infrared absorbing filter according to the invention can be used, for example, as such a near infrared absorbing filter that is disposed between light accepting parts of pixels and microlenses for light condensation, which constitute CCD.

Besides, a thermal polymerization inhibitor may be used in order to improve a storage stability of the composition of the present invention. In addition, an organic carboxylic acid, preferably a low molecular weight organic carboxylic acid having a molecular weight of 1000 or less may be added to the composition of the present invention in order to accelerate an alkali solubility of the radiation-unexposed portion, thereby to achieve a further improvement in development property of the composition of the present invention.

(Method of Producing a Resin Coating of the Present Invention)

The resin coating of the present invention may be formed by the steps of first, mixing a near infrared-absorbing dye, a dispersant and a solvent with optionally used additives such as an alkali-soluble resin, a light-sensitive polymerization component and a photo-polymerization initiator, or mixing a near infrared-absorbing dye, a dispersant and a solvent with optionally used additives such as a binder, a monomer and a thermo-setting resin, subsequently mixing and dispersing the mixture using various kinds of mixer and dispersing machine (a mixing and dispersing step) to prepare a composition of the present invention, and then coating the composition on a substrate, followed by drying.

In the above-described mixing and dispersing step, it is preferable to use a method of conducting the hereinafter-described kneading and dispersing process and a dispersing process successive thereto.

(Preparation of a Composition of the Present Invention)

As described above, to form the resin coating of the present invention, it is preferable to use dye particles pulverized into fine particles and having a sharp particle-diameter distribution. Specifically, the lake dye preferably has an average particle diameter of approximately 0.01 to 1.0 μm, and contains lake dye particles having a particle diameter in the range of 0.01±0.005 μm in an amount of 75% by mass or more.

The method of dispersing the lake dye is particularly important, in adjusting the lake dye particle-diameter distribution in the range above. An example of the dispersion method is a method in combination of dry dispersion (kneading dispersion) in the high-viscosity state by using a kneader or a roll mill such as two-roll mill and wet dispersion (fine dispersion) in the relatively low-viscosity state by using a three-roll mill, a bead mill, or the like. In the dispersion method, it is also preferable to disperse two or more lake dyes together, to use no or the minimal amount of solvent during kneading dispersion or to use a dispersing agent. It is preferable to add a resin component in two portions during the kneading dispersion and during the fine dispersion (two-portion addition) to alleviate the solvent shock, and it is also preferable to use a resin component higher in solubility for prevention of the reaggregation of pigment particles when the processing is changed from kneading dispersion to fine dispersion. It is also effective to use high-rigidity ceramic particles or smaller-diameter beads as the medium in the bead mill used during fine dispersion. As the resin component, for example, the alkali-soluble resin can be used.

In the present invention, it is particularly preferable to use two or more lake dyes in combination, disperse the two or more lake dyes in a high-viscosity state of 50,000 mPa·s or more and additionally in a low-viscosity state of 1,000 mPa·s or less.

Generally, the lake dye is supplied after it is dried by various methods after preparation. The pigment is normally supplied as powder after it is separated from an aqueous medium and dried, but drying for powder demands a lot of heat energy, because the latent vaporization heat of water during drying is required greatly. As a result, the lake dye is normally present as the aggregate of secondary particles.

The method of preparing the composition according to the present invention preferable in the present invention will be described. However, the invention is not limited thereto.

Specifically, it is preferable to add an alkali-soluble resin and other dispersant to the lake dye, and knead and disperse the mixture until it has a relatively high viscosity of 50,000 mPa·s or more (preferably 50,000 to 100,000 mPa·s) after kneading dispersion. The kneading dispersion may be high-viscosity dispersion or dry dispersion.

It is preferable to add the alkali-soluble resin then as needed to the dispersion solution after kneading dispersion, and disperse the mixture finely until it has a relatively low-viscosity of 1,000 mPa·s or less (preferably 100 mPa·s or less) after fine dispersion. The fine dispersion may be low-viscosity dispersion or wet dispersion.

In the kneading dispersion above, the ratio of the solvent to the dispersion is preferably 0 to 20% by mass. It is possible to deposit the components mainly consisting of a vehicle resin component on the lake dye particle surface by dispersing the mixture in this manner without use of much solvent, and thus, to convert an interface formed by the pigment particle surface from a solid/gas interface between the lake dye particle and air to a solid/solution interface between the lake dye particle and vehicle solution. It is possible to disperse the lake dye into the microstate close to the primary particle thereof, by converting the interface formed by the lake dye particle surface from with air to with solution, and mixing and agitating the dye particles.

Thus, it is effective to change the lake dye particle surface from the interface with air to that with solution, to disperse the lake dye more efficiently. Strong shearing and compressive forces are demanded for the conversion. Thus, it is preferable to use a kneader that applies strong shearing and compressive forces in the kneading dispersion, and also to use high-viscosity dye particles.

It is also preferable to mix and agitate the mixture together with a fine particulate dispersion medium such as of glass or ceramic in the fine dispersion process. The ratio of the solvent used in the fine dispersion is preferably 20 to 90% by mass with respect to the dye particles to be dispersed. Because it is necessary to disperse the lake dye particles until they are uniformly distributed in the microstate during the fine dispersion, it is preferable to use a dispersing machine that applies strong impact and shearing forces to the aggregated lake dye particles and to use low-viscosity dye particles.

In the kneading dispersion process for producing a near infrared-absorbing filter as an example using the composition of the present invention, there can be kneaded at first a coloring agent such as a lake dye, a dispersant, a surfactant and a minimum amount of a solvent. As a kneader, there can be used two roller mill, three roller mill, boll mill, toron mill, disper, kneader, co-kneader, homogenizer, blender, and mono axial or biaxial extruder. The composition is dispersed while giving a strong shearing force thereto. Of the above-described kneader, the two roller mill is especially preferred. Subsequently, a solvent and optionally an alkali-soluble resin are added to the composition, and dispersed mainly using a dispersing machine such as a vertical or horizontal sand grinder, a ball mill, a pin mill, a slit mill, a homogenizer, a disper, and an ultrasonic dispersing machine, with beads made of materials such as glass and zirconium each of which has a particle size of from 0.1 to 1 mm.

The details of the techniques concerning kneading and dispersion are described in T. C. Patton, "Paint Flow and Pigment Dispersion", John Wiley & Sons (1964), and the like.

Thereafter, the thus-obtained composition of the present invention is coated on a substrate directly or through other layer using a coating method such as a rotary coating, a slit coating, a cast coating, and a roll coating to form a dyed resin coating (a radiation-sensitive composition layer) of the present invention. Subsequently, the radiation-sensitive composition layer is exposed through a predetermined mask pattern so that only a radiation-exposed portion is hardened. Development with a developing solution enables to produce a pattern-formed coating that is composed of image elements (pixels) of each color (three or four colors) like a color filter. As the radiation used in this step, ultraviolet rays such as g-line and i-line are especially preferably used. The term "radiation" referred to in the present invention is used as a broad concept embracing a visible light, ultraviolet, far-ultraviolet, and x-ray.

Subsequently, the unexposed portion formed in the proceeding exposure step is eluted into an alkaline aqueous solution according to the alkali development processing, which results in only a photo-setting portion being left. As the developing solution, any one may be used, in so far as the developing solution dissolves a light-sensitive layer of the unexposed portion, but not the exposed portion.

Further, a superfluous developing solution is removed by washing. After drying, a thermal processing (post bake) is conducted at a temperature of from 50° C. to 240° C.

When any pattern development according to the alkali development processing is not performed, the near infrared-absorbing dye-containing curable composition is subjected to a thermal-setting or photo-setting process to prepare a hardened film.

Examples of the substrate include a non-alkali glass, a soda glass, PYREX (registered trademark) glass, a quartz glass, and these substrates having a transparent electrically conductive film attached thereon, each of which is used for a liquid crystal display device and the like, and a photoelectric conversion element substrate (e.g., a silicon substrate) used for a solid state imaging device and the like. In addition, a plastic substrate may be also used. On the substrate, there may be generally formed black stripes separating image elements from each other.

The near infrared-absorbing dye-containing curable composition of the present invention is preferably located in an upper layer of the color filter. However, there is no particular limitation in the location, in so far as a film production can be completed in the interval of from a color filter to a seal glass. A film thickness is not limited in particular, and may be arbitrarily selected in the range of from 0.01 μm to 2,000 μm. The distance from an upper layer of the color filter to an upper layer of the micro lens is preferably in the range of from about 0.01 μm to about 500 μm, and more preferably from about 0.01 μm to about 50 μm. In the case of film production on a glass, the film thickness is not limited in particular, but preferably in the range of from about 0.01 to about 2,000 μm, and more preferably from about 0.01 μm to about 1,000 μm.

(Filter for Plasma Display Panel)

The dye, especially the lake dye represented by the formula (V) of the present invention can be applied to a near infrared-absorbing filter for a plasma display panel. In the publication of JP-A-2002-90521, there are described a transparent support, a subbing layer, a filter layer, an anti-reflecting layer, an electromagnetic wave-shielding layer and the like for a plasma display panel.

The present invention will be described in more detail with reference to examples, but the invention is not construed as being limited to the examples unless the spirit and scope of the invention is overrode.

EXAMPLES

All the "parts" are by mass unless otherwise indicated.

Example 1

Preparation of Near Infrared Cut Filter

The following composition was mixed with stirring to prepare a resin composition for a flattening layer.

[Composition]

| | |
|---|---|
| Copolymer of benzyl methacrylate and methacrylic acid (copolymerization molar ratio = 70/30, weight average molecular weight 30,000) | 165 parts by mass |
| Dipentaerythritol pentacrylate | 65 parts by mass |
| Propylene glycol monomethyl ether acetate | 138 parts by mass |
| Ethyl-3-ethoxypropionate | 123 parts by mass |
| Halomethyltriazine-series initiator (Photopolymerization initiator, TAZ-107 (trade name) manufactured by Midori Kagaku Co., Ltd.) | 3 parts by mass |

The thus-obtained resin composition for a flattening layer was uniformly coated by a spin coat on an eight inch silicon wafer having thereon a photodiode. Herein, the spin coat was performed controlling number of revolutions so that after coating, a thermal processing is conducted using a hot plate under the conditions of a surface temperature of the coating being 110° C.×120 seconds and a thickness of the film obtained at that time becomes 2 μm.

Thereafter, color filters were prepared. First, colorant compositions (Green, Red and Blue) were prepared according to the composition set forth in Table 1 and the following preparation of dyed resin composition. Then, the colorant compositions were coated on the previously prepared flattening layer in the order of Green, Red and Blue, followed by drying (pre bake), pattern exposure, alkali development, rinse, and hardening drying (post bake) to prepare dyed resin coatings. Thereby, color filters of each of Green, Red and Blue colors were prepared on a silicon wafer having attached thereon a photodiode.

<Preparation of Dyed Resin Composition>

The following composition was mixed while stirring with a pigment dispersion of each color obtained according to the formulation set forth in Table 1, on the basis of 200 parts by mass of the pigment dispersion. Thereby, a dyed resin composition for a color filter of each color was prepared.

[Composition]

| | |
|---|---|
| Copolymer of benzyl methacrylate and methacrylic acid (Alkali-soluble resin, copolymerization molar ratio = 70/30, weight average molecular weight 30,000) | 33 parts by mass |
| Dipentaerythritol pentacrylate (monomer) | 36 parts by mass |
| Propylene glycol monomethyl ether acetate | 110 parts by mass |
| Ethyl-3-ethoxypropionate (solvent) | 44 parts by mass |
| Oxime-series initiator (Photopolymerization initiator, CGI-242 (trade name) manufactured by Ciba Specialty Chemicals Inc.) | 4 parts by mass |

(Near Infrared Cut Film A)

The following composition was dispersed using EIGAR motor mill for 3 hours to obtain a solid dispersion for a near infrared cut filter.

[Composition]

| | |
|---|---|
| Wet dispersant KS-873N (a product of Kusumoto Chemical) | 10 parts by mass |
| Dye 1-12 according to the present invention | 10 parts by mass |
| Propylene glycol monomethyl ether acetate | 60 parts by mass |

TABLE 1

| | Pigment dispersion (1) Green (G) | Pigment dispersion (2) Blue (B) | Pigment dispersion (3) Red (R) |
|---|---|---|---|
| Coloring agent | 90 mass parts of Pigment Green (PG) 36, 25 mass parts of Pigment Green (PG) 7, 40 mass parts of Pigment Yellow (PY) 139 | 125 mass parts of Pigment Blue (PB) 156, 25 mass parts of Pigment Violet (PV) 23 | 80 mass parts of Pigment Red (PR) 254, 20 mass parts of Pigment Yellow (PY) 139 |
| Dispersing agent | PLAAD ED151 (manufactured by Kusumoto Chemical) 20 mass parts | PLAAD ED211 (amideamine salt of high molecular polycarboxylic acid, manufactured by Kusumoto Chemical) 40 mass parts | EDAPLAN472 (manufactured by Kusumoto Chemical) 30 mass parts |
| Resin | Copolymer of benzyl methacrylate and methacrylic acid (copolymerization molar ratio = 70:30, weight average molecular weight 30,000) 25 mass parts | Copolymer of benzyl methacrylate and methacrylic acid (copolymerization molar ratio = 70:30, weight average molecular weight 30,000) 25 mass parts | Copolymer of benzyl methacrylate and methacrylic acid (copolymerization molar ratio = 70:30, weight average molecular weight 30,000) 25 mass parts |
| Solvent | Propylene glycol monomethyl ether acetate 625 mass parts | Propylene glycol monomethyl ether acetate 785 mass parts | Propylene glycol monomethyl ether acetate 750 mass parts |
| Viscosity at the time of the kneading dispersion processing | 55,000 mPa · s | 55,000 mPa · s | 70,000 mPa · s |
| Viscosity at the time of the kneading fine dispersion processing | 15 mPa · s | 15 mPa · s | 30 mPa · s |
| Average particle size of pigment | 0.015 μm | 0.013 μm | 0.014 μm |
| Percentage of pigment particles having a particle size of 0.01 ± 0.005 μm | 98.1 mass % | 95.9 mass % | 94.1 mass % |

The pattern exposure was conducted through a 1.5 μm mask pattern under the conditions of 300 mJ/cm$^2$ using an i-line stepper (trade name: FPA-3000 i 5+, a product of Canon Corporation). Beside, the alkali development was conducted by a paddle development with a 40 mass % aqueous solution of the organic alkaline developer (trade name: CD-2000, a product of Fuji Film Electronics Materials) at room temperature for 60 seconds. Thereafter, a rinse was conducted by a spin shower with pure water for 20 seconds, followed by washing with pure water. Subsequently, the same rinse and washing step as the above was repeated. Thereafter, water droplets were blown off with a high pressure air and the substrate was subjected to a natural drying to obtain a pattern, and then subjected to a post bake process on a hot plate under the conditions of surface temperature of 200° C. for 5 minutes. Hereinafter, the thus-obtained sample is referred to as SAMP-1.

Thereafter, the solid dispersion was mixed while stirring with other ingredients of the composition set forth below to obtain a curable composition for the hereinafter-described near infrared cut filter.

[Composition]

| | |
|---|---|
| The above-described solid dispersion | 50 parts by mass |
| Copolymer of benzyl methacrylate and methacrylic acid | 2 parts by mass |
| EHPE 3150 (a product of Daicel Chemical Industries, alicyclic solid epoxy resin) | 3 parts by mass |

A near infrared cut resin composition was uniformly coated by spin coat on the SAMP-1 so that an average film thickness became 1.0 μm. Subsequently, the coating was dried at 100° C. for 2 min.

Thereafter, the above sample was heated on a hot plate at 220° C. for 5 min to form a hardened film. Thus, a flattened near infrared cut film A having a near infrared cut ability was formed on the color filter.

Example 2

A near infrared cut film B was formed in the same manner as Example 1, except that Dye 1-16 was used in place of Dye 1-12 according to the present invention in Example 1.

Example 3

A near infrared cut film C was formed in the same manner as Example 1, except that Dye 2-5 was used in place of Dye 1-12 according to the present invention in Example 1.

(Evaluation of Optical Filter)

Absorption was evaluated of the near infrared cut filters obtained by the above-described method. Separately, absorption was also evaluated of a transparent glass substrate having thereon carried a near infrared cut resin composition having the same film thickness as the above-described near infrared cut filters. Besides, absorption in a solution was also evaluated at the same time. The near infrared cut films A, B and C displayed λmax of 900 nm, 960 nm and 830 nm, respectively. Dye 1-12, Dye 1-16 and Dye 2-5 according to the present invention displayed λmax of 780 nm/H$_2$O, 836 nm/H$_2$O and 620 nm/DMF, respectively. In addition, a mixture of Dye 1-2, Dye 1-5 and Dye 2-5 according to the present invention enabled to obtain a near infrared cut filter having an absorption in a wide near infrared region.

With respect to the near infrared cut filters formed in the above-described method, spectral characteristics were not changed even though these filters were left under the thermal conditions of about 260° C. in the subsequent process such as a soft soldering step (leadless soldering). Accordingly, it was recognized that these filters were very stable. Besides, they were so excellent in adhesiveness to the under lying color filter that no peeling was found even after the heat step. Further, it was recognized that these filters were also stable to light.

Example 4

Both sides of biaxially a stretched polyethylene terephthalate transparent film having thicknesses of 175 μm were subjected to corona discharge treatment, and then a styrene-butadiene copolymer latex (LX407C5, manufactured by Zeon Corporation) having a refractive index of 1.55 and a glass transition temperature of 37° C. was coated on both sides of the films, thereby undercoat layers were formed. Coating was performed so as to obtain a dry thickness of 300 nm.

The following composition was dispersed using EIGAR motor mill for 3 hours to obtain a solid dispersion (a) for a near infrared cut filter.

[Composition]

| | |
|---|---|
| Dispersant DEMOL SNB (a product of Kao Corporation) | 1 parts by mass |
| Dye 1-13 according to the present invention | 10 parts by mass |
| Ion-exchanged water | 89 parts by mass |

Likewise, a solid dispersion (b) was obtained using Dye 1-15 according to the present invention. Further, a solid dispersion (c) was obtained using Dye 2-5 according to the present invention.

To 180 g of a 10 mass % gelatin aqueous solution were added 45.9 mg (dye-reduced amount) of the solid dispersion (a), 29.1 mg (dye-reduced amount) of the solid dispersion (b) and 24.5 mg (dye-reduced amount) of the solid dispersion (c). The thus-obtained coating liquid for a filter layer was coated on the 300 nm thick subbing layer side of a transparent support so that a dry film thickness of the filter layer became 3.5 μm. Subsequently, the filter layer was dried at 120° C. for 10 minutes to prepare an optical filter.

A spectral transmittance of the thus-obtained optical filter was examined. As a result, it was found that the optical filter had absorption maxima at 810 nm, 904 nm and 985 nm.

(Evaluation of Optical Filter)

An outermost surface film on a front plate of the plasma display panel on the market (PDS4202J-H, a product of Fujitsu Corporation) was peeled and the prepared optical filter was attached with adhesives in place of the peeled outermost surface film. Examination was made whether there was any malfunction of a remote controller of the television set located facing to the plasma display panel. As a result, it was found that when the optical filter of the present invention was used, no malfunction arose. Further, it was recognized that the optical filter was also stable to light.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A near infrared-absorbing filter comprising a layer obtained by curing a curable composition,
    wherein the curable composition comprises a lake dye having an absorption maximum in the wavelength region of from 700 nm to 1100 nm and a thermo-setting compound and/or a photo-setting compound, and
    wherein the lake dye is represented by the following formula (V):

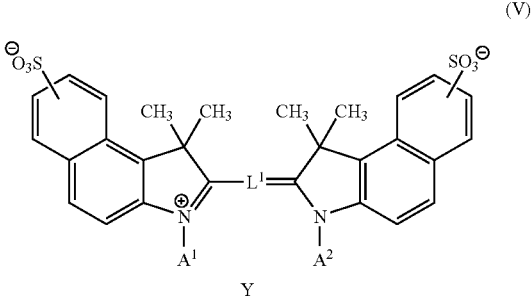

wherein L$^1$ represents a methine chain composed of odd number(s) of methine group(s); A$^1$ and A$^2$ each independently represents an alkyl group having a sulfo group; Y represents a cation necessary to balance a charge and selected from the group consisting of Mg$^{2+}$, Ca$^{2+}$, Ba$^{2+}$, Sr$^{2+}$, Ag$^+$, Fe$^+$, Co$^{2+}$, Ni$^{2+}$, Cu$^{2+}$, Zn$^{2+}$ and Al$^{3+}$.

2. The near infrared-absorbing filter according to claim 1, wherein the lake dye is a dye in an association state.

3. The near infrared-absorbing filter according to claim 1, wherein the curable composition further comprises a binder, a free-radical polymerizable monomer, a photo polymerization initiator, a heat polymerization initiator, a crosslinking agent, and/or a dispersant.

4. A plasma display panel comprising the near infrared-absorbing filter according to claim 1.

5. A solid state imaging device comprising the near infrared-absorbing filter according to claim 1.

* * * * *